(12) United States Patent
Onaka et al.

(10) Patent No.: US 6,359,726 B1
(45) Date of Patent: *Mar. 19, 2002

(54) WAVELENGTH DIVISION MULTIPLEXING OPTICAL AMPLIFIER WITH FUNCTION OF GAIN-EQUALIZING AND OPTICAL COMMUNICATION SYSTEM

(75) Inventors: Miki Onaka; Susumu Kinoshita, both of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/451,088

(22) Filed: Nov. 30, 1999

(30) Foreign Application Priority Data

Mar. 2, 1999 (JP) .............................. 11-054374

(51) Int. Cl.[7] ................................. H01S 3/00
(52) U.S. Cl. ................. 359/337.1; 359/341.41
(58) Field of Search ................. 359/134, 160, 359/174, 194, 337, 341, 337.1, 337.13, 337.4, 341.41; 372/6

(56) References Cited

U.S. PATENT DOCUMENTS

| 5,436,760 A | * | 7/1995 | Nakabayashi | 359/341 |
| 5,570,221 A | * | 10/1996 | Fujita | 359/161 |
| 5,737,118 A | * | 4/1998 | Sugaya et al. | 359/341 |
| 5,818,629 A | * | 10/1998 | Kinoshita | 359/341 |
| 5,963,361 A | * | 10/1999 | Taylor et al. | 359/337 |
| 6,067,187 A | * | 5/2000 | Onaka et al. | 359/341 |
| 6,151,157 A | * | 11/2000 | Ball et al. | 359/341 |
| 6,151,158 A | * | 11/2000 | Takeda et al. | 359/341 |
| 6,219,176 B1 | * | 4/2001 | Terahara | 359/341 |

FOREIGN PATENT DOCUMENTS

| JP | 6-169122 | 6/1994 |
| JP | 8-248455 | 9/1996 |
| JP | 11-68203 | 3/1999 |

* cited by examiner

Primary Examiner—Thomas H. Tarcza
Assistant Examiner—Deandra M. Hughes
(74) Attorney, Agent, or Firm—Staas & Halsey LLP

(57) ABSTRACT

An object of the invention is to provide a WDM optical amplifier and an optical communication system which can ensure wavelength flatness for gain across a wide range of input light power levels, and which can obtain noise characteristics with minimum wavelength dependency. Accordingly, the basic construction of the WDM optical amplifier has; an optical amplification section connected between input and output ports, an input light monitoring section for measuring the input light power input to the input port, a variable gain equalizer with variable insertion loss wavelength characteristics, connected to the optical amplification section, and a gain equalization control section for controlling the insertion loss wavelength characteristic of the variable gain equalizer in accordance with the input light power measured by the input light power monitoring section. Due to this construction, the variable gain equalizer is supplied with an insertion loss wavelength characteristic which corresponds with the variation in the gain wavelength characteristic of the optical amplification section, enabling compensation for any gain deviation in the output light.

18 Claims, 18 Drawing Sheets

(A) LOSS WAVELENGTH CHARACTERISTIC OF FORMER STAGE VGEQ (B) LOSS WAVELENGTH CHARACTERISTIC OF LATTER STAGE VGEQ (A) FORMER OPTICAL AMPLIFICATION SECTION (B) LATTER OPTICAL AMPLIFICATION SECTION

WAVELENGTH DIVISION MULTIPLEXING OPTICAL AMPLIFIER WITH FUNCTION OF GAIN-EQUALIZING AND OPTICAL COMMUNICATION SYSTEM

BACKGROUND OF THE INVENTION (1) Field of the Invention

The present invention relates to an optical amplifier which amplifies in one batch a wavelength division multiplexed (WDM) signal light incorporating a plurality of optical signals of different wavelengths, as well as to an optical communication system which utilizes the optical amplifier and carries out repeater transmission of the WDM signal light, and in particular relates to a WDM optical amplifier and an optical communication system which display excellent noise characteristics and which will accommodate input light power level over a wide range.

(2) Description of the Related Art

The Wavelength Division Multiplexing (WDM) optical transmission system is a transmission system which, by transmitting a plurality of optical signals of different wavelengths through a single optical fiber, enables an increase in communication capacity. The WDM optical transmission system offers several advantages including low introduction costs due to the fact that existing optical fibers can be utilized, and ease of any future upgrades as the transmission path is bit rate free due to the use of optical amplifiers and the like.

In order to achieve the required transmission characteristics, an important factor for optical amplifiers for use in WDM optical transmission systems is the requirement to maintain the output light at a predetermined constant level while simultaneously suppressing the wavelength dependency of the gain in the signal light band. Specifically, the maintenance at a constant level of the output light power per single wavelength as well as the wavelength flatness of the gain is required even if the input light power varies over a wide range.

An example of an optical amplifier which meets the aforementioned requirements, in which the basic construction thereof comprises the positioning of a variable optical attenuator between the two stages of an optical amplification section of a two stage construction, has been proposed by the present applicants. In the proposed optical amplifier basic construction, automatic gain control (AGC) is carried out at both the former stage optical amplification section and the latter stage optical amplification section to control the gain at a constant level, and automatic level control (ALC) is carried out, by adjusting the amount of optical attenuation at the variable optical attenuator positioned between the two stages, to control the output light level from the optical amplifier at the required constant level. Consequently, even if the power level of the input light varies, the gain wavelength characteristic for each optical amplification section is maintained at a constant level, and moreover the output light level from the optical amplifier is also maintained at the required level.

Optical amplifiers of two stage construction have also been proposed in, for example, Japanese Unexamined Patent Publication No. 8-248455 and Japanese Unexamined Patent Publication No. 6-169122. In the optical amplifiers proposed therein, the gain for the entire optical amplifier is controlled at a constant level, and the wavelength characteristic of the gain is maintained at a constant level even if the input light power changes. Moreover, the applicant of the present invention has also proposed a technique wherein a gain equalizer (optical filter) is used for flattening the gain wavelength characteristic of the optical amplification section (refer to Japanese Patent Application No. 9-216049).

With the aforementioned conventional optical amplifiers, in the case where the input light power is comparatively small, AGC operation of each of the amplification sections is possible, but in the case where the input light power increases and the excitation light power of the former stage optical amplification section reaches an upper limit value, AGC operation of the former optical amplification section stops and the excitation light power is controlled at a constant level, resulting in a reduction in the former stage gain. Consequently, in the case where the excitation light power of the former optical amplification section reaches the upper limit value, in order to keep the gain for the entire optical amplifier at a constant value regardless of the input light power, the gain for the latter optical amplification section is controlled to be increased by an amount equivalent to the gain reduction in the former optical amplification section, thus maintaining the wavelength flatness of the gain at a constant level.

However, with the aforementioned conventional optical amplifiers, in the case where the input light power into the former optical amplification section reaches the upper limit value of the excitation light power, any increase in the input light power will result in the gain wavelength characteristic for each optical amplification section varying from the design value thereof. As a result, in those cases where compensation for the gain wavelength characteristic of the optical amplification section is made based on fixed characteristics referenced to the design value (for example, the use of a gain equalizer with a fixed loss wavelength characteristic in both the former and latter optical amplification sections), the system is unable to cope with variations in the gain wavelength characteristic when the input light power is large, and a situation arises where the signal light power is lost in excessive amounts in the former optical amplification section which has stringent noise characteristics.

Specifically, in conventional optical amplifiers of two stage construction, the gain wavelength characteristics of the former optical amplification section and the latter optical amplification section vary in accordance with the input light power as shown in FIGS. 17(A) and 17(B) respectively. The gain wavelength characteristics shown in FIG. 17 are those where each of the optical amplification sections are known erbium doped optical fiber amplifiers (EDFA) and the wavelength band is the 1.55 $\mu$m band (around 1535 nm~1561 nm).

Focussing on the former optical amplification section, which has a large effect on the noise characteristics of the optical amplifier, as shown in FIG. 17(A), when the input light power is a comparatively small −16.6 dBm/ch the gain at the short wavelength side of the 1.55 $\mu$m band is higher than the gain at the long wavelength side of the band. On the other hand, when the input light power increases to −9.6 dBm/ch there is insufficient excitation light power to achieve the required gain so that the gain decreases. In such a case the gain at the short wavelength side of the band decreases considerably, to be relatively lower than the gain at the long wavelength side of the band.

Until now, former stage optical amplification sections with gain wavelength characteristics as those described above, were fitted with a gain equalizer with loss wavelength characteristics which were previously designed to correspond with the gain wavelength characteristics for when the input light power was comparatively small (with a relatively large loss at the short wavelength side). Consequently, in the case where the input light power was increased, even though the gain at the short wavelength side of the band decreased, the gain equalizer, which has a fixed loss wavelength characteristic, caused excessive amounts of optical power to be lost at the short wavelength side, generating a problem of inferior noise characteristics for the optical amplifier at the short wavelength side.

FIG. 18 is a diagram which shows the noise characteristics (noise factor) of a conventional optical amplifier as those described above, in accordance with the input light power.

As shown in FIG. 18, when the input light power is comparatively small an approximately uniform noise factor is obtained for the entire width of the 1.55 $\mu$m band, but as the input light power increases the noise factor at the short wavelength side of the band becomes relatively greater, meaning the noise characteristics deteriorate for the optical amplifier at the short wavelength side.

SUMMARY OF THE INVENTION

It is an object of the present invention to resolve the above issues and provide a WDM optical amplifier and an optical communication system which achieve simultaneously wavelength flatness for both the signal light gain and the noise factor for input light over a wide range of levels, to display excellent noise characteristics.

In order to achieve the above object, a WDM optical amplifier of the present invention equipped with an optical amplification device for amplifying in one batch a WDM signal light, comprises an input light measurement device for measuring input light power, a gain equalization device which is connected to the optical amplification device and has loss wavelength characteristics for suppressing the wavelength dependency characteristics of the gain of the optical amplification device, and moreover is able to vary the loss wavelength characteristics, and a gain equalization control device for controlling the loss wavelength characteristics of the gain equalization device in accordance with the input light power measured by the input light measurement device.

With such a construction, a WDM signal light (input light) input into the WDM optical amplifier is amplified in one batch by the amplification device. At this point, because the optical amplification device has gain wavelength dependency, a gain deviation (tilt) is generated in the WDM signal light following amplification (the output light). As the operating gain of the optical amplification device varies in accordance with the input light power, the gain deviation of the output light will vary dependent upon the input optical level. However, this type of output light gain deviation is suppressed by the gain equalization device with variable loss wavelength characteristics. That is, by using the gain equalization control device to control the variable loss wavelength characteristics of the gain equalization device in accordance with the input light power as measured by the input light measurement device, the gain equalization device is supplied with a loss wavelength characteristic which corresponds with the variation in the gain wavelength characteristic of the optical amplification device, enabling compensation for any gain deviation in the output light. Consequently, wavelength flatness of the gain can be ensured for input light over a wide range of levels.

Furthermore, with the WDM optical amplifier described above, a configuration is also possible where the gain equalization device is provided for each stage of a multi-stage construction optical amplification device, and the gain equalization control device respectively controls the loss wavelength characteristics of each of the gain equalization devices.

With such a construction, even in the case of an optical amplification device of multi-stage construction such as a two stage construction with former and latter optical amplification sections, compensation for the gain deviation generated at each stage is performed by the corresponding gain equalization device.

Moreover, a configuration is also possible where the WDM optical amplifier described above is equipped with a gain constant control device for controlling at a constant level the gain of the optical amplification device, and the gain equalization control device judges whether or not the optical amplification operation of the foremost stage optical amplification device is saturated, based on the input light power measured by the input light measurement device, and then respectively controls the loss wavelength characteristic of each of the gain equalization devices.

With such a construction, because the gain constant control device controls the optical amplification operation of the optical amplification device, ensuring that the gain of the optical amplification device is constant, even if the input light power fluctuates, the gain wavelength characteristics of the optical amplification device will not vary. This gain constant control functions effectively when the optical amplification operation is not saturated, but upon saturation the gain decreases so that the gain wavelength characteristics of the optical amplification device will vary. Consequently, the gain equalization control device judges the saturation of the optical amplification operation based on the input light power, and controls each of the gain equalization devices so that the loss wavelength characteristics correspond with the gain wavelength characteristics at saturation, to thereby obtain output light with flat wavelength characteristics even for high level input light such as that generating saturation of an optical amplification device.

A specific construction of the aforementioned WDM optical amplifier is possible wherein the WDM signal light has a wavelength band of 1.55 $\mu$m, the optical amplification device incorporates an erbium doped optical fiber amplifier, and the gain equalization control device controls the loss wavelength characteristics so that when a judgement is made of saturation of the, optical amplification operation in the foremost stage optical amplification device, the amount of loss at the short wavelength side of the 1.55 $\mu$m band for the gain equalization device provided at the foremost stage optical amplification device is less than the amount of loss when the optical amplification operation is not saturated.

Furthermore, for WDM optical amplifiers equipped with optical amplification devices of multi-stage construction, it is preferable that of the plurality of gain equalization devices, the gain equalization device provided for the foremost stage optical amplification device is connected to the output side of the foremost stage optical amplification device, and of the plurality of gain equalization devices, the gain equalization device provided for the lattermost stage optical amplification device is connected to the input side of the lattermost stage optical amplification device.

With such a construction, by providing a gain equalization device at the output side of the foremost optical amplification device, any imposing of loss on the WDM signal light input into that optical amplification device can be prevented and the noise characteristics thus improved, and moreover by providing a gain equalization device at the input side of the lattermost optical amplification device, any imposing of loss on the WDM signal light output from that optical amplification device can be prevented and a high efficiency rate ensured for the excitation light power.

Moreover, with the WDM optical amplifier described above, it is preferable that an output level control device is provided for controlling the output light power per single wavelength at a constant level. Specifically, the output level control device may be equipped with a variable optical attenuation section which is connected between the foremost optical amplification device and the lattermost optical amplification device, and an optical attenuation amount control section for controlling the amount of optical attenuation at the variable optical attenuation section so that the output light power per single wavelength attains a constant level.

With such a construction, a WDM signal light is output from the optical amplifier in which the signal light power for each wavelength has been controlled at a predetermined constant value.

In addition, a specific construction of the WDM optical amplifier described above is possible wherein the gain equalization device is equipped with a first optical filter with a fixed loss wavelength characteristic and a second filter with a loss wavelength characteristic which can be varied linearly, and the gain equalization control device controls the loss wavelength characteristic of the second filter in accordance with the input light power measured by the input light measurement device.

Furthermore, with the WDM optical amplifier described above, it is preferable that there is provided an output deviation detection device for detecting, based on spontaneous emission light generated by the optical amplification device, the output deviation between the signal light of each wavelength incorporated in the output light, and the gain equalization control device controls the loss wavelength characteristic of the gain equalization device in accordance with the input light power measured by the input light measurement device and the output deviation detected by the output deviation detection device.

With such a construction, the gain equalization control device also controls the loss wavelength characteristic of the gain equalization device in accordance with the output deviation of the output light, which is detected by the output deviation detection device based on spontaneous emission light. Consequently, output light with wavelength flatness can be achieved even in the case of an input light power with a wavelength characteristic, and furthermore because detection of the output deviation of the output light based on spontaneous emission light enables detection of the deviation of the output light to be conducted regardless of any fluctuation in the number of signal light or the signal light wavelengths, control of the required gain equalization in accordance with the installation environment of the optical amplifier can be carried out with even greater reliability.

Moreover, in another possible construction of the WDM optical amplifier described above, the gain equalization device is equipped with a plurality of gain equalizers which each have a different fixed loss wavelength characteristic, and the gain equalization control device selects one of the plurality of gain equalizers in accordance with the input light power or the like measured by the input light measurement device and connects the selected gain equalizer to the optical amplification device.

With such a construction, by selectively connecting one of a plurality of gain equalizers of a fixed loss wavelength characteristic in accordance with the input light power, a gain equalization device which corresponds to the complex gain wavelength characteristics of the optical amplification device can be achieved comparatively easily.

An optical communication system of the present invention is an optical communication system which is equipped with a plurality of the type of WDM optical amplifiers described above, and which further comprises an optical SN ratio measurement device for measuring the optical SN ratio of the WDM signal light transmitted through the plurality of WDM optical amplifiers, and a gain equalization management device for sending sequentially to the gain equalization control device of each of the plurality of WDM optical amplifiers a management signal for controlling the loss wavelength characteristic of the gain equalization device so that the optical SN ratio measured by the optical SN ratio measurement device is improved beyond a preset value. Moreover, it is preferable that the gain equalization management device sends the management signal preferentially to the gain equalization control device of the WDM optical amplifier located at the transmission end.

With an optical communication system of such a construction, the optical SN ratio of the WDM signal light transmitted through the plurality of WDM optical amplifiers is measured by the optical SN ratio measurement device provided at the reception end, and the loss wavelength characteristic of the gain equalization device of each optical amplifier is then managed by the gain equalization management device so that the measured optical SN ratio is improved beyond a required value. Consequently, even for loss wavelength characteristics resulting from the installation environment of the optical amplifier and variations in the gain wavelength characteristic of the optical amplifier itself, the optimum amount of gain compensation can be applied at the best location within the optical communication system.

Other objects, aspects and benefits of the present invention will become apparent from the following description of embodiments given in conjunction with the appended drawings.

DETAILED DESCRIPTION OF THE INVENTION

As follows is a description of embodiments of the present invention based on the drawings. In all the drawings, those sections which are substantially equivalent are labeled with the same reference symbol.

Figure 1:
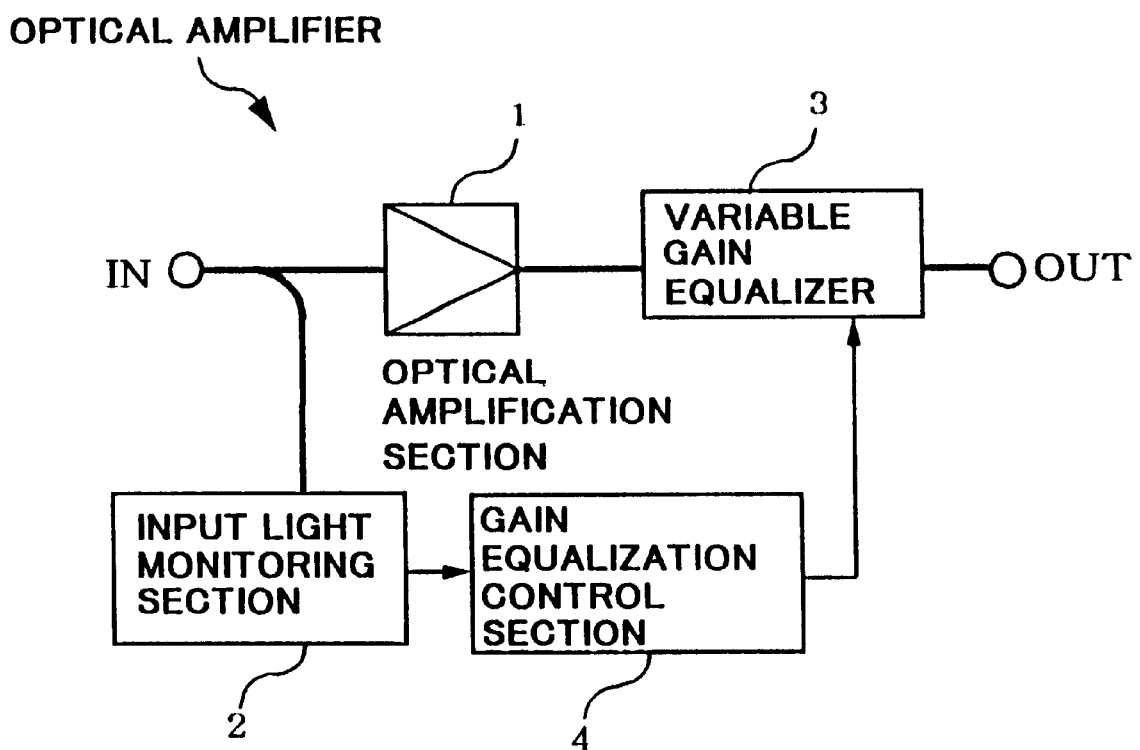
FIG. 1 is a block diagram showing a first basic construction of a WDM optical amplifier according to the present invention.

FIG. 1 is a block diagram showing a first basic construction of a WDM optical amplifier according to the present invention.

The WDM optical amplifier of FIG. 1 is provided with an optical amplification section 1 which functions as an optical amplification device connected between an input port IN and an output port OUT, an input light monitoring section 2 which functions as an input light measurement device for measuring the input light power input via the input port IN, a variable gain equalizer 3 which functions as a gain equalization device with variable loss wavelength characteristics and which is connected, for example, between the optical amplification section 1 and the output port OUT, and a gain equalization control section 4 which functions as a gain equalization device for controlling the loss wavelength characteristic of the variable gain equalizer 3 in accordance with the input light power measured by the input light monitoring section 2.

Figure 17:
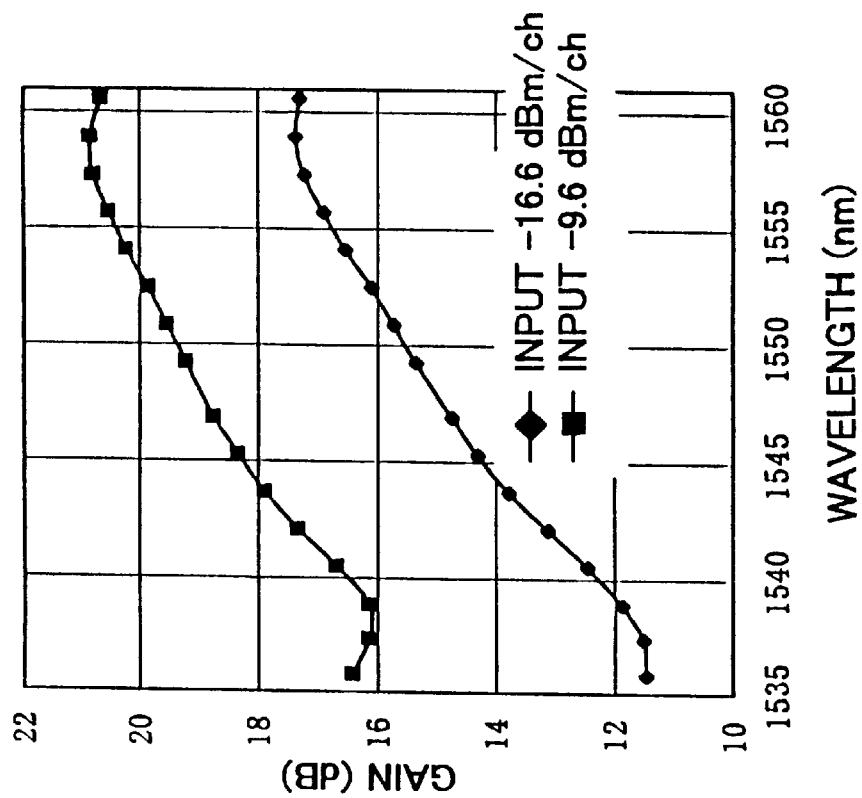
FIG. 17 is a diagram showing gain wavelength characteristics in accordance with input light power in a conventional two stage optical amplifier, where (A) represents the characteristic for a former stage optical amplification section, and (B) the characteristic for a latter stage optical amplification section.
Figure 17:
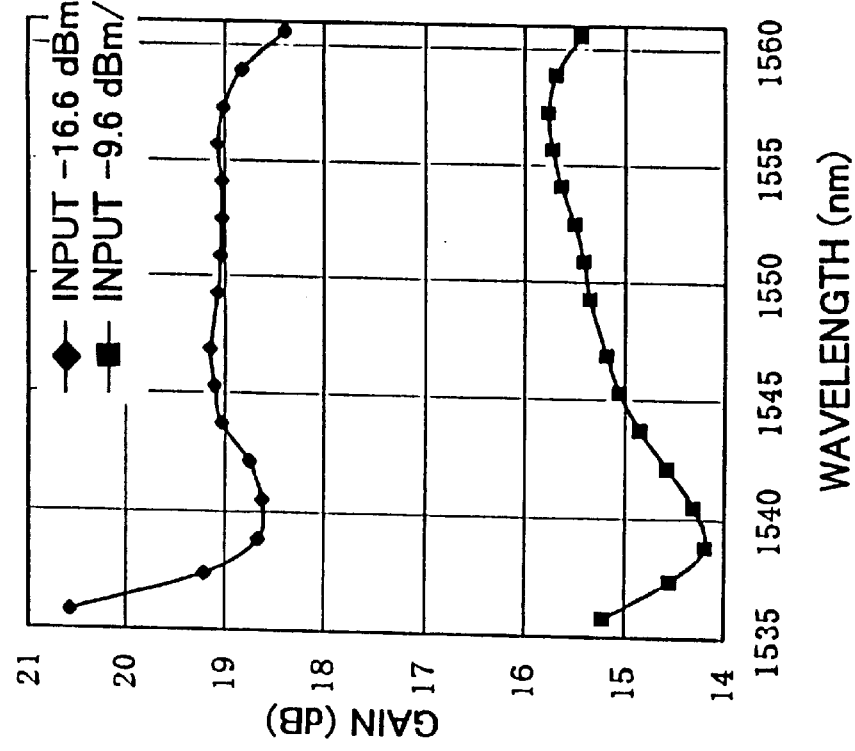
Figure 18:
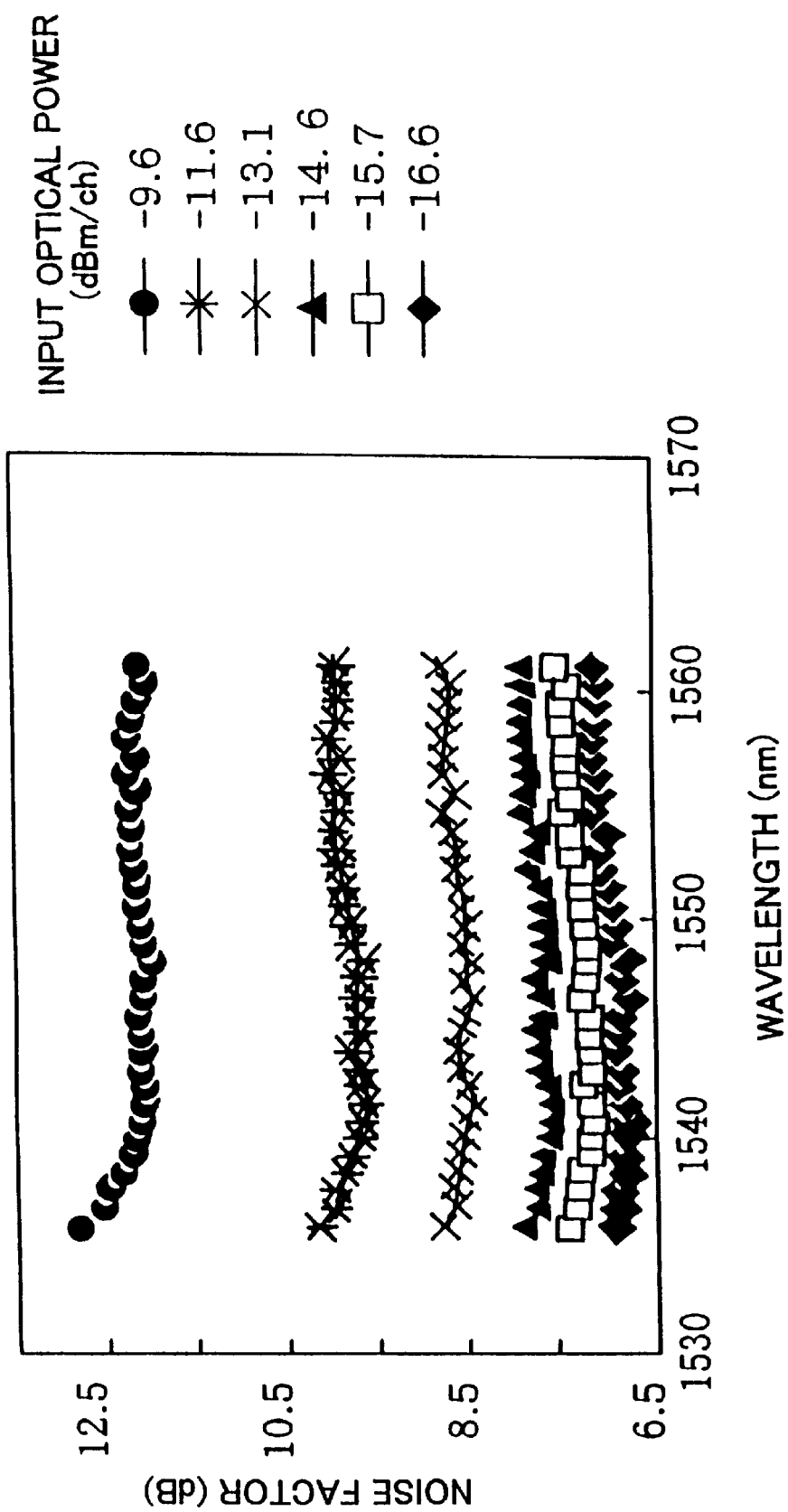
FIG. 18 is a diagram showing noise characteristics (noise factor) of a conventional optical amplifier in accordance with input light power.

The optical amplification section 1 is a conventional optical amplifier which is able to amplify, in one batch, a WDM signal light incorporating a plurality of optical signals of different wavelengths. As shown in FIG. 17, the optical amplification section 1 possesses a gain wavelength characteristic which is inherent to the optical amplification medium being used (gain wavelength dependency), and when the operating gain varies in accordance with the input light power, the gain wavelength characteristic will vary in accordance with the optical power being input.

The input light monitoring section 2 branches off a portion of the input light sent from the input port IN to the optical amplification section 1 and measures the optical power thereof, and then detects the input light power based on the measurement results.

The variable gain equalizer 3 possesses a loss wavelength characteristic which enables suppression of the wavelength dependency of the gain of the optical amplification section 1, namely a loss wavelength characteristic which corresponds with the gain wavelength characteristic of the optical amplification section 1, where the loss wavelength characteristic can be varied in accordance with an external signal. In this description there is shown the case where the variable gain equalizer 3 is connected to the output side of the optical amplification section 1, but the variable gain equalizer 3 could also be positioned at the input side of the optical amplification section 1.

The gain equalization control section 4 determines the operating condition of the optical amplification section 1 based on the input light power value from the input light monitoring section 2, and then generates a signal for controlling the loss wavelength characteristic of the variable gain equalizer 3 so that the gain wavelength characteristic corresponding to the input light of the optical amplification section 1 is suppressed, and sends the signal to the variable gain equalizer 3.

With a WDM optical amplifier of such a basic construction, a WDM signal light input via the input port IN is sent to the optical amplification section 1, while a portion of the input light is branched off and sent to the input light monitoring section 2. In the optical amplification section 1, the signal light of each wavelength are amplified in one batch using a gain wavelength characteristic corresponding to the input light power and then sent to the variable gain equalizer 3. At this point, the loss wavelength characteristic of the variable gain equalizer 3 is controlled by a signal from the gain equalization control section 4 to generate a characteristic which corresponds with the actual gain wavelength characteristic of the optical amplification section 1. Consequently, at the variable gain equalizer 3, the output light from the optical amplification section 1 is attenuated in accordance with the controlled loss wavelength characteristic, and a WDM signal light which displays uniform power with respect to wavelength is output from the output port OUT.

In this manner the optical amplifier is able to reliably compensate for the gain wavelength characteristic of the optical amplification section which varies in accordance with the input light power, even in those cases where the input level of the WDM signal light varies over a wide range, and so an output light with flat gain wavelength characteristics can be obtained. Consequently, the excessive loss of a WDM signal light observed in conventional fixed gain equalizers can be prevented, and in the case where the gain equalizer is positioned on the input side of the optical amplification medium, the noise characteristics of the optical amplifier can be improved.

Next is a description of a preferred embodiment of a WDM optical amplifier according to the aforementioned first basic construction.

Figure 2:
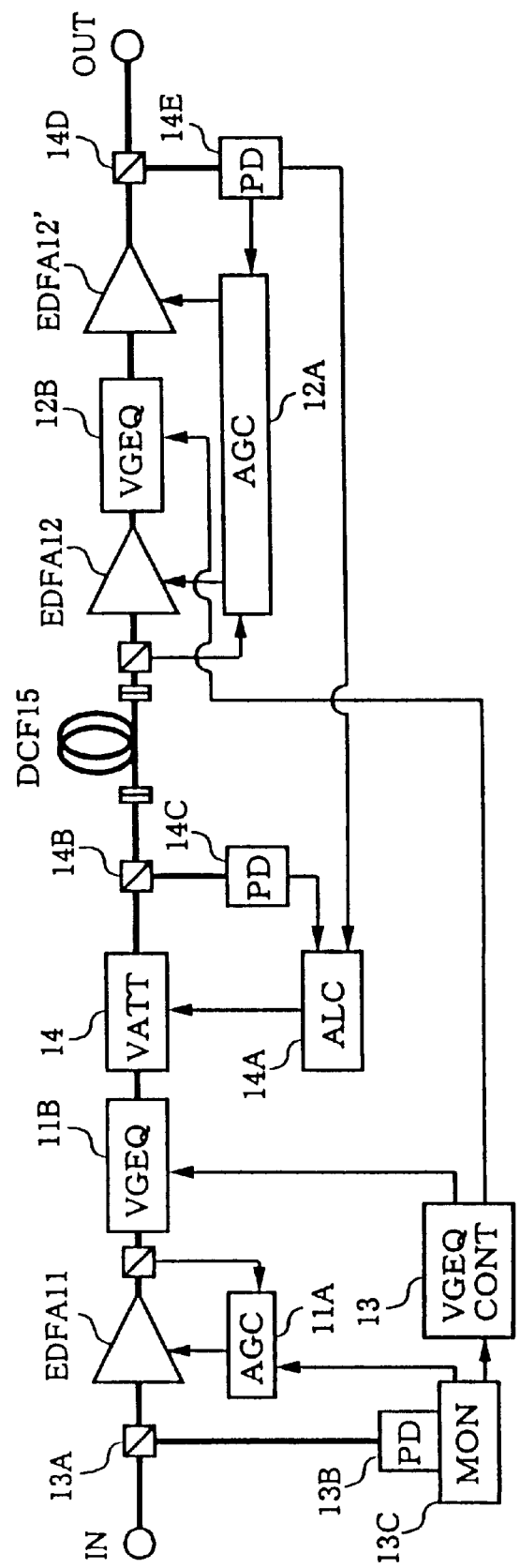
FIG. 2 is a block diagram showing the construction of a first embodiment of an optical amplifier according to the first basic construction.

FIG. 2 is a block diagram showing the construction of a first embodiment of a WDM optical amplifier.

The first embodiment of a WDM optical amplifier of FIG. 2 is constructed so that the aforementioned basic construction has been applied to a conventional construction with a variable optical attenuator positioned between the two stages of an optical amplification section of substantially two stage construction. In this example construction, erbium doped optical fiber amplifiers (EDFA) are used for the former stage and latter stage optical amplification sections, with the former stage optical amplification section having one EDFA 11 and the latter stage optical amplification section having two EDFA 12, 12' connected in series. Although the latter stage is constructed as a two stage EDFA 12, 12', a two stage construction was only used in order to achieve a higher output from the optical amplifier, and substantially the latter stage can be thought of as a single EDFA.

Each EDFA 11, 12, 12', causes a 1.55 $\mu$m band WDM signal light to be entered into and pass through an erbium doped optical fiber (EDF), which is in an excited state following reception of an excitation light, and then amplifies the signal light of each wavelength in one batch. The excitation light wavelength for each EDFA can be set to either the 0.98 $\mu$m band or the 1.48 $\mu$m band, and in this example the excitation light wavelength is set to the 0.98 $\mu$m band for the EDFA 11 and 12 to enable a lowering of the noise for the optical amplifier, with the excitation light wavelength being set to the 1.48 $\mu$m band for the EDFA 12' to achieve a higher output level.

Furthermore, each EDFA is also equipped with an AGC circuit 11A, 12A respectively for controlling the gain at a constant level. Each AGC circuit monitors the power of both the input light and the output light of the corresponding EDFA, and automatically controls the power of the excitation light so that the gain for the EDFA reaches a required value. In this example, each AGC circuit is operated so that the total gain is controlled at a constant level in all of the EDFAs.

The gain wavelength characteristics for the former stage optical amplification section (EDFA11) and the latter stage optical amplification section (EDFA 12,12') display the same characteristics as those described above in FIGS. 17(A) and (B) respectively. Specifically, the gain wavelength characteristic of EDFA11 is characterized by a relative reduction in the gain at the short wavelength side of the 1.55 $\mu$m band in comparison with the long wavelength side, when the input light power is increased and the excitation light power reaches an upper limit value (when the optical amplification operation of the EDFA 11 becomes saturated). This variation in gain wavelength characteristic due to increased input light power is a result of the AGC of the former stage optical amplification section being unable to function effectively when the excitation light power reaches the upper limit value. In contrast, the gain wavelength characteristic of EDFA12, 12' is such that the gain at the short wavelength side is relatively small in comparison with that at the long wavelength side, and this relationship remains the same even when the input light power is increased. The reason for this relationship is that even for input light power levels which cause the excitation light power of the EDFA11 to reach the upper limit value, the latter stage EDFA12, 12' is not saturated, and consequently AGC of the entire optical amplifier will function effectively and the gain wavelength characteristic will be maintained at a constant level.

In order to suppress the gain wavelength dependency as described above, the former stage optical amplification section EDFA 11 in the optical amplifier according to the present embodiment is equipped with a variable gain equalizer (VGEQ) 11B, and the latter stage optical amplification section EDFA12, 12' is equipped with a variable gain equalizer (VGEQ) 12B. For each of the variable gain equalizers 11B, 12B, the use of variable optical filters which utilize acousto-optical effects (AOTF) is particularly suitable. This AOTF is a device which by controlling the frequency of an externally applied RF signal, is able to vary the surface acoustic wave (SAW) and vary the loss wavelength characteristic.

Figure 3:
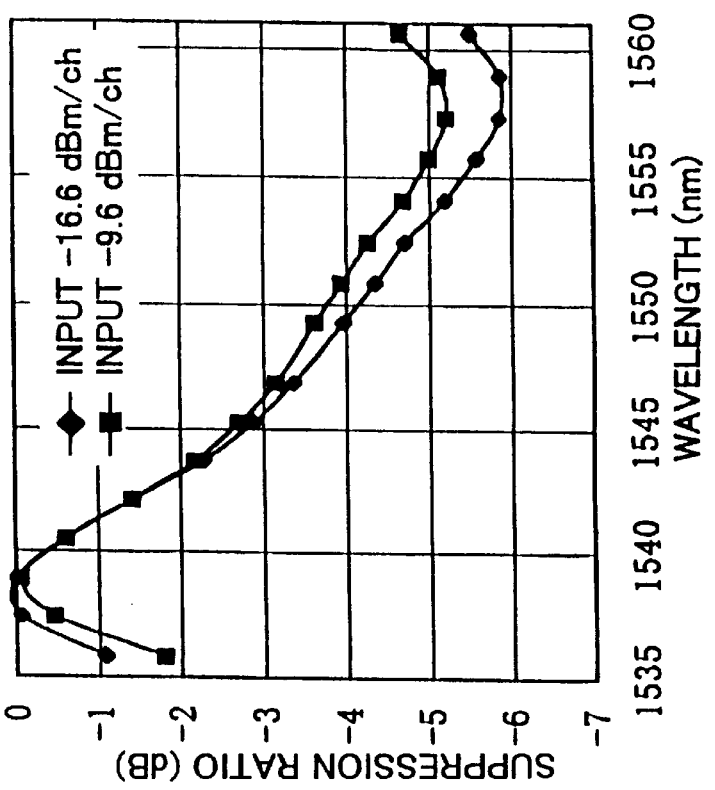
FIG. 3 is a diagram showing loss wavelength characteristics of a variable gain equalizer used in the first embodiment, where (A) represents the characteristic for a former stage variable gain equalizer and (B) the characteristic for a latter stage variable gain equalizer.
Figure 3:
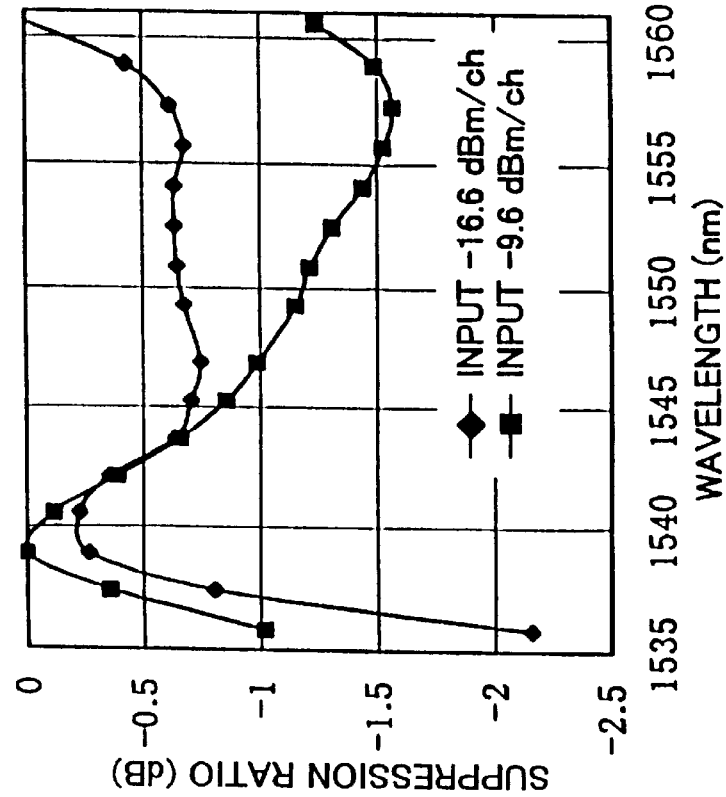

FIG. 3 is a diagram showing sample loss wavelength characteristics for each variable gain equalizer corresponding to the input light power, where (A) represents the characteristic for the former stage variable gain equalizer 11B, and (B) the characteristic for the latter stage variable gain equalizer 12B.

As shown in FIG. 3, the loss wavelength characteristic for each variable gain equalizer 11B, 12B has characteristics which correspond to the gain wavelength characteristic of each of the EDFA11 and EDFA12, 12'. That is, the loss wavelength characteristic of the variable gain equalizer 11B shown in FIG. 3(A) is such that when the input light power is comparatively small at −16.6 dBm/ch, the suppression ratio at the long wavelength side of the 1.55 $\mu$m band is approximately constant, and the absolute value of the suppression ratio (the amount of loss) in the 1540 nm short wavelength region is small when compared with the long wavelength side. Furthermore, when the input light power is large at −9.6 dBm/ch, the suppression ratio in the 1540 nm region is approximately 0 dB with the absolute value of the suppression ratio increasing towards the long wavelength side. In this case, a design is preferable in which for the amount of variation in the suppression ratio with respect to the wavelength (the slope), the value in the region between 1535~1539.8 nm (the short wavelength side) is approximately four times the value observed in the 1539.8~1561 nm region.

In contrast, the loss wavelength characteristic of the variable gain equalizer 12B shown in FIG. 3(B) is such that when the input light power is comparatively small at −16.6 dBm/ch, the suppression ratio in the 1540 nm short wavelength region is approximately 0 dB with the absolute value of the suppression ratio increasing towards the long wavelength side. Furthermore, when the input light power is increased, the absolute value of the suppression ratio in the 1540 nm region is slightly larger than that observed when the input light power is small, but the wavelength characteristics are almost equivalent.

Moreover, a gain equalization control circuit (VGEQ CONT) 13 is provided (FIG. 2) for each of the aforementioned variable gain equalizers 11B, 12B. The gain equalization control circuit 13 generates signals for controlling the loss wavelength characteristic of each of the variable gain equalizers 11B, 12B in accordance with the input light power. The input light power value sent to the gain equalization control circuit 13 is obtained via an optical coupler 13A, a photodetector (PD) 13B and an input light monitoring circuit (MON) 13C. The optical coupler 13A is inserted between the input port IN and the EDFA 11, and branches off a portion of the input light to send a branched light to the photodetector 13B. The photodetector 13B converts the branched light from the optical coupler 13A into an electrical signal to send the electrical signal to the input light monitoring circuit 13C. The input light monitoring circuit 13C computes the input light power corresponding to the signal from the photodetector 13B and then sends the result to the gain equalization control circuit 13.

Furthermore, a variable optical attenuator (VATT) 14 constituting an output level control device is provided between the former stage optical amplification section and the after stage optical amplification section of the optical amplifier of this embodiment. The variable optical attenuator 14 is a conventional optical attenuator which is able to change the amount of optical attenuation based on an external signal. The amount of optical attenuation at the variable optical attenuator 14 is controlled by a signal output by an ALC circuit 14A which functions as an optical attenuation amount control section. Based on a signal produced by the optical-electrical conversion by a photodetector (PD) 14C of the branched light which has been output from the variable optical attenuator 14 and then branched off by an optical coupler 14B, and a signal produced by the optical-electrical conversion by a photodetector (PD) 14E of the branched light which has been output from the EDFA12' and then branched off by an optical coupler 14D, the ALC circuit 14A generates a signal for controlling the amount of optical attenuation of the variable optical attenuator 14 so that the output light power per single wavelength of the optical amplifier is controlled at a constant level.

Moreover, in this embodiment a dispersion compensation fiber (DCF) 15 for compensating for wavelength dispersion, which occurs for example in the optical fiber transmission path connected to the optical amplifier, is connected for example between the optical coupler 14B and the EDFA12. The dispersion compensation fiber 15 can be provided in those situations where dispersion compensation is deemed necessary, and typically should preferably be provided in the optical amplifier when the transmission speed exceeds 2.5 Gb/s (for example 10 Gb/s).

In an optical amplifier of the first embodiment of the construction described above, a WDM signal light input via the input port IN is sent to the EDFA11 via the optical coupler 13A while a portion of the light is branched off by the optical coupler 13A, converted to an electrical signal by the photodetector 13B and then sent to the input light monitoring circuit 13C.

At the EDFA11, the signal light of each wavelength are amplified in one batch using gain wavelength characteristics corresponding to the input light power and the amplified signals are then sent to the variable gain equalizer 11B. In those cases where the input light power is comparatively small and the excitation light power has not reached the upper limit value, the AGC circuit 11A functions effectively and the gain is controlled at a constant level. In contrast, in those cases where the input light power increases and the excitation light power has reached the upper limit value, the operation of the EDFA11 shifts to excitation light power constant control and the gain is no longer maintainable at a constant level, and in such cases the amount of gain reduction on the short wavelength side of the 1.55 µm band becomes greater than that on the long wavelength side.

At the input light monitoring circuit 13C, the input light power is determined based on a signal from the photodetector 13B, and this result is sent to the gain equalization control circuit 13. Then signals which have been preset for each of the variable gain equalizers 11B, 12B in accordance with the input light power are output from the gain equalization control circuit 13 to each of the variable gain equalizers 11B, 12B respectively. Based on the signals from the gain equalization control circuit 13, the loss wavelength characteristics for each variable gain equalizer 11B, 12B are controlled so as to correspond to the input light power.

The output light sent from the EDFA11 to the variable gain equalizer 11B is attenuated in accordance with the loss wavelength characteristic corresponding to the input light power. The feature of this process is that when the input light power is increased, the amount of loss on the short wavelength side for the variable gain equalizer 11B decreases in accordance with the gain reduction on the short wavelength side for the EDFA11, so that the wavelength flatness of the gain is maintained for the former optical amplification section. Then, having undergone gain equalization at the variable gain equalizer 11B, the WDM signal light is sent to the EDFA12 via the variable optical attenuator 14, the optical coupler 14B and the dispersion compensation fiber 15.

The WDM signal light sent to the EDFA12 is amplified in one batch under control of the AGC circuit 12A, after which gain equalization is carried out by the variable gain equalizer 12B in accordance with the input light power. The WDM signal light which has undergone gain equalization by the variable gain equalizer 12B is then sent to the EDFA12' and batch amplified under the control of the AGC circuit 12A. The output light from the EDFA 12' comprises a WDM signal light in which the signal light power of each wavelength is uniformly aligned.

Furthermore in the optical amplifier of the present embodiment, a portion of the output light from the EDFA12' and a portion of the output light from the variable optical attenuator 14 are supplied as feedback to the ALC circuit 14A, via the optical couplers 14D and 14B and the photodetectors 14E and 14C respectively, where the amount of optical attenuation of the variable optical attenuator 14 is then controlled by the ALC circuit 14A. Consequently, a WDM signal light in which the output light power per single wavelength has been controlled to a constant level is output externally via the output port OUT.

As follows are simulation results for the noise characteristics of the optical amplifier of the first embodiment.

Typically the noise factor NF of an optical amplifier is computed by the Formula (1).

$$NF = 10\log\left\{NF_{amp(1)} + \frac{NF_{amp(2)}}{G_{amp(1)}} + \frac{NF_{amp(3)}}{G_{amp(1)} \cdot G_{amp(2)}} + \ldots \frac{NF_{amp(n)}}{\prod_{k=1}^{n} G_{amp(k)}}\right\} \quad (1)$$

$$NF_{amp(n)} = L_{(n)} + NF_{EDF(n)}$$

$$G_{amp(n)} = \{\text{gain of } EDF_{(n)}\} - L(n)$$

$$NF_{EDF} = 10\log\left\{\frac{10^{(PASE/10)}/1000}{h\nu \cdot \Delta\nu \cdot 10^{G/10}}\right\} \quad [dB]$$

In the above formula, $EDF_{(n)}$ represents the nth stage optical amplification medium, $L_{(n)}$ the optical component insertion loss in the nth stage optical amplification section, $NF_{EDF(n)}$ the noise factor for $EDF_{(n)}$, $P_{ASE}$ the power[dBm] of the spontaneously emission (ASE) light, h Planck's constant, ν the carrier frequency of the light, Δν the band width [Hz] as determined by resolution power of the optical spectral analyzer, and G the signal gain [dB].

Figure 4:
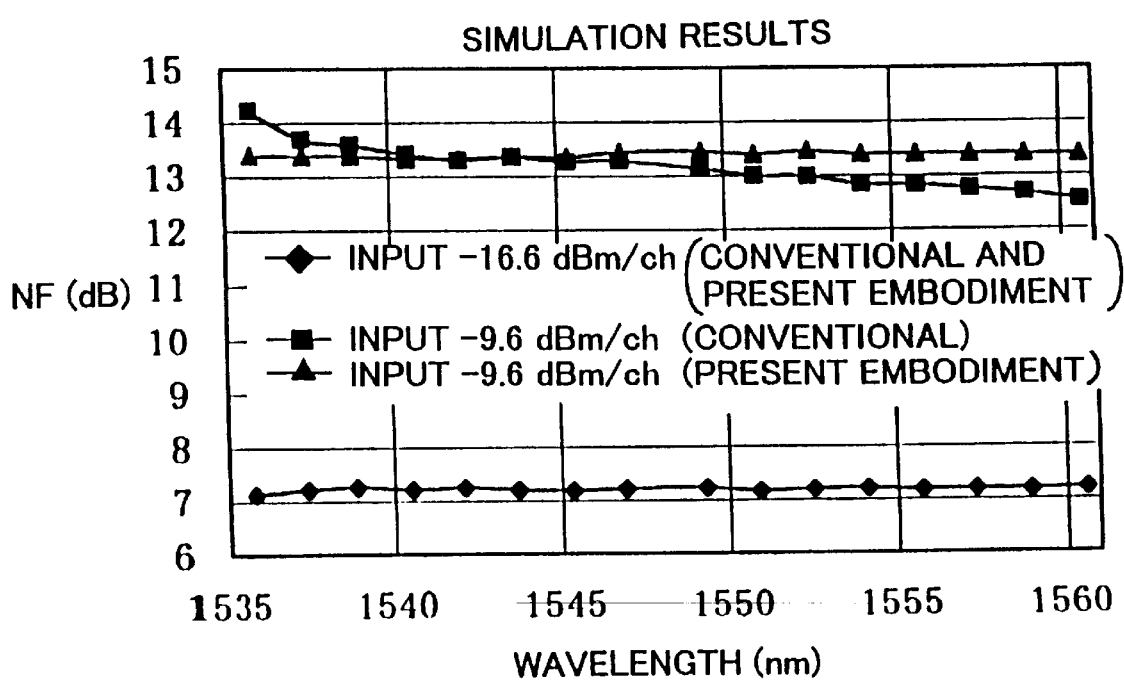
FIG. 4 is a diagram showing the results of a simulation of noise characteristics for the optical amplifier of the first embodiment.

Because the optical amplifier of the present embodiment is constructed of three EDFAs, the noise factor can be computed for n=3 using the Formula (1). Here the input light power was assumed to be −16.6 dBm/ch and −9.6 dBm/ch, with a setting made for a reduction of approximately 4 dB in the gain of the former stage EDFA 11 when the input light power was −9.6 dBm/ch. The noise factor NF was then simulated for both an optical amplifier of the present embodiment and a conventional optical amplifier (which utilizes a fixed gain equalizer). The results of the simulations are shown in Table 1 and FIG. 4.

TABLE 1

| Optical amplifier Input light power [dBm/ch] | Noise factor wavelength deviation[dB] (1535.82~1560.61 nm) | Worst noise factor in the signal band [dB] |
| --- | --- | --- |
| −16.6 (Conventional and the present embodiment) | 0.13 | 7.26 |
| −9.6 (Conventional) | 1.7 | 14.23 |
| −9.6 (Present embodiment) | 0.14 | 13.46 |

From the results of this type of simulation, it is apparent that compared with a conventional device, the optical amplifier of the present embodiment offers a 1.56 dB improvement in terms of wavelength flatness of the noise factor (wavelength deviation), and an improvement of 0.8 dB in terms of the worst noise factor.

The optical amplifier of the first embodiment then, enables wavelength flatness to be achieved concurrently for both the gain and the noise factor even in cases of input light over a wide range. Consequently, even in the case of large input light power the problem associated with conventional devices where the noise characteristics deteriorate at the short wavelength side of the 1.55 μm band do not arise, and an optical amplifier with excellent noise characteristics is achievable.

Figure 5:
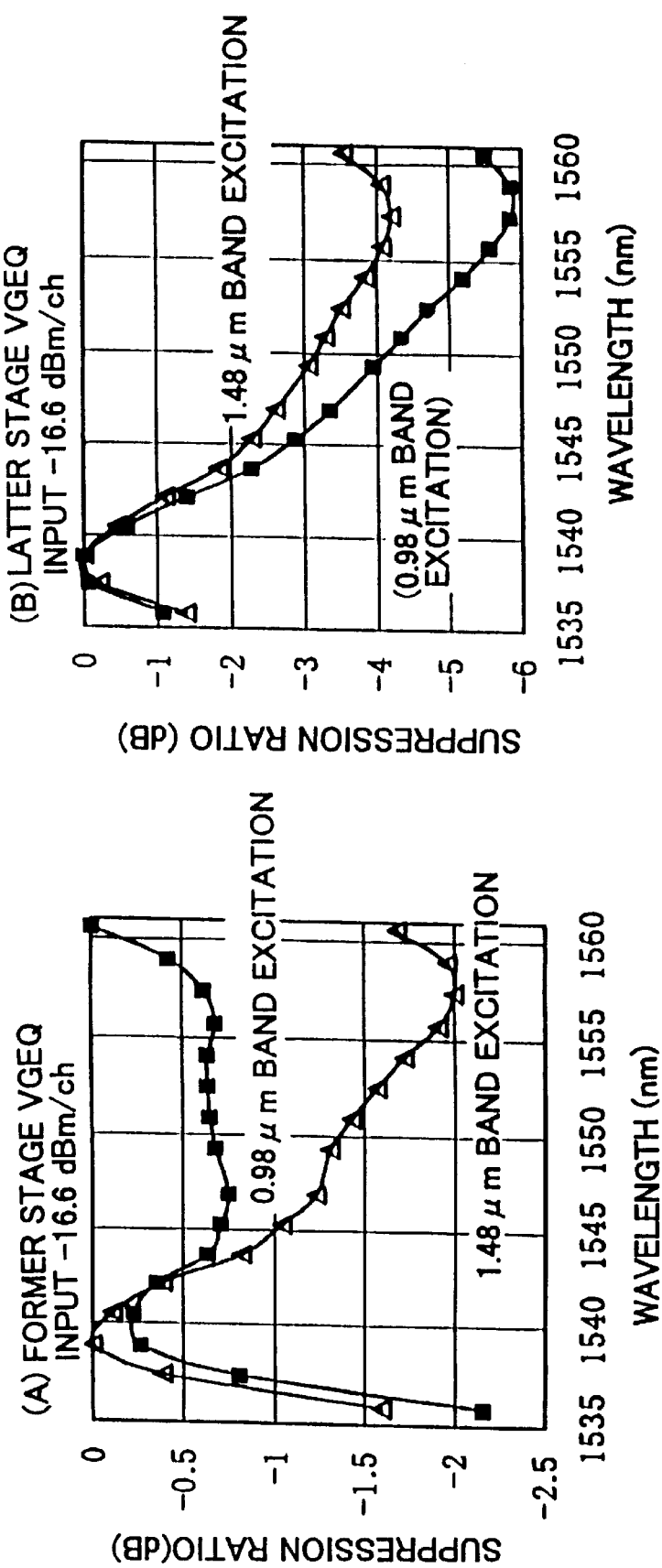
FIG. 5 is a diagram showing the loss wavelength characteristics of suitable variable gain equalizers for the case where 1.48 $\mu$m band excitation is used in the former stage optical amplification section of the first embodiment, where (A) represents the characteristic of the former stage variable gain equalizer, and (B) the characteristic for the latter stage variable gain equalizer.

In the first embodiment, the 0.98 μm band was used as the excitation light wavelength for the former stage optical amplification section. As is clear from Formula (1), this value takes into consideration the fact that the noise characteristics of the former stage optical amplification section have a large effect on the noise characteristics of the entire optical amplifier. However, in those cases where the 1.48 μm band needs to be used as the excitation light wavelength for the former stage optical amplification section, then even in those cases where the input light power is comparatively small, the noise characteristics of the short wavelength side of the 1.55 μm band are poor. In such cases, even when the input light power is comparatively small the short wavelength side loss of the former stage variable gain equalizer 11B is actively reduced, and the loss of the latter stage variable gain equalizer 12B then increased in accordance with the amount of reduction. In FIGS. 5(A) and (B) one example of the loss wavelength characteristics for the former and latter stage variable gain equalizers for an input light power of −16.6 dBm/ch are shown for the former stage excitation wavelengths.

By taking the above course of action, the wavelength characteristics will match the gain of the former stage optical amplification section, and an error will develop in the gain constant control. However, in the case of a 1.48 μm band excitation mode, the simulation results reveal that the improvement effect on the noise characteristics is greater than the effect of the gain constant control error. That is, calculation of the worst noise factor for when the input light power is −16.6 dBm/ch produces a value of 7.67 dB if the above course of action is not taken and a value of 7.29 dB when the above course of action is taken, offering an improvement effect of 0.38 dB. Consequently, implementation of the above course of action is effective in cases where the former stage optical amplification section is set to the 1.48 μm band excitation mode.

Next is a description of a second embodiment of a WDM optical amplifier.

Figure 6:
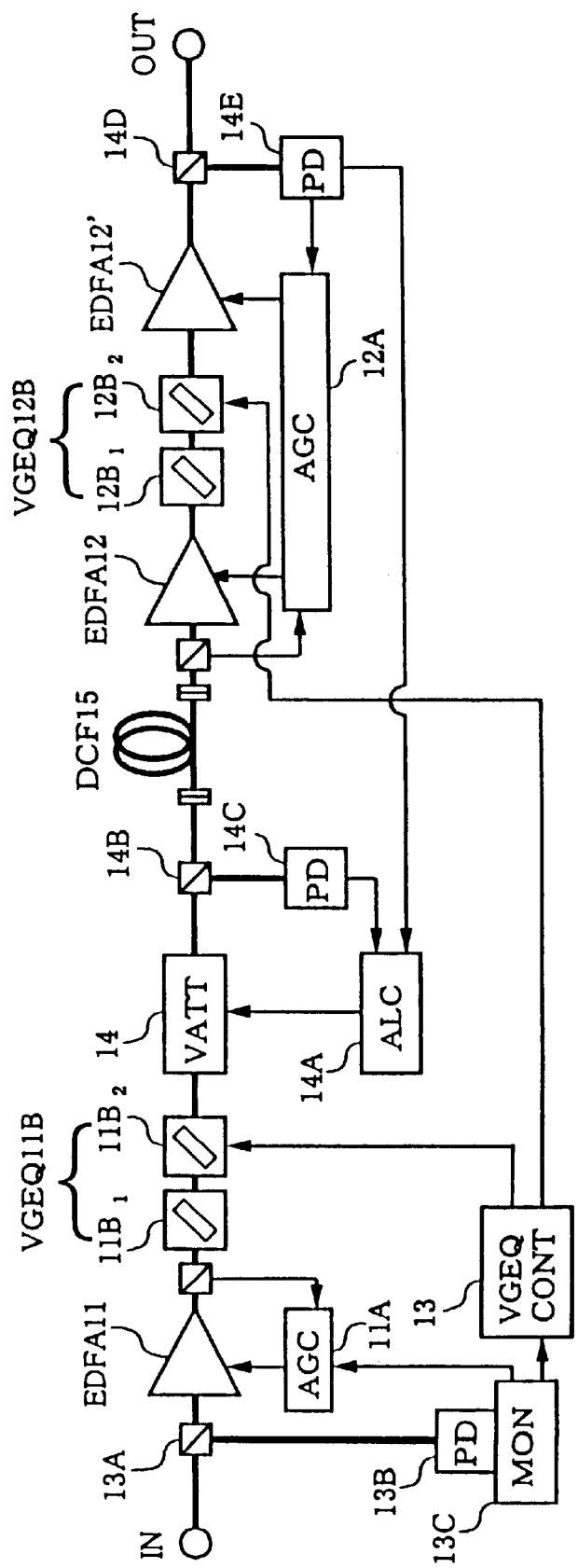
FIG. 6 is a block diagram showing the construction of a second embodiment of an optical amplifier according to the first basic construction.

FIG. 6 is a block diagram showing the construction of a second embodiment of a WDM optical amplifier.

The optical amplifier in FIG. 6 is constructed so that for the optical amplifier of the first embodiment (FIG. 2), the former stage variable gain equalizer 11B is constructed of two optical filters $11B_1$, $11B_2$ and the latter stage variable gain equalizer 12B is constructed of two optical filters $12B_1$, $12B_2$. The construction of the second embodiment is identical with that of the first embodiment except for the above differences and so the description is omitted here.

The optical filter $11B_1$ constructing the variable gain equalizer 11B is the same type of optical filter seen in conventional devices and has a fixed loss wavelength characteristic, and this loss wavelength characteristic is designed to correspond to the gain wavelength characteristic (design values) of the EDFA11 as a reference. Suitable examples of the optical filter device include fiber Bragg gratings and etalon filters. Furthermore in the same way as was described for the optical filter $11B_1$, the optical filter $12B_1$ constructing the variable gain equalizer 12B is an optical filter with a fixed loss wavelength characteristic corresponding to the gain wavelength characteristics of the EDFA12, 12' as a reference.

The optical filter $11B_2$ constructing the variable gain equalizer 11B is an optical filter with a linear loss wavelength characteristic with respect to the wavelength, in which the slope of the linearity is able to be varied, and the loss wavelength characteristic is designed as a linear variable wavelength characteristic so that compensation can be made for gain deviations which occur in cases such as when the gain wavelength characteristic of the EDFA11 fluctuates from the design value. Suitable examples of this type of optical filter device include optical filters which utilize a magneto-optical effect or an acousto-optical effect. Furthermore, the optical filter $12B_2$ constructing the variable gain equalizer 12B is identical to the optical filter $11B_2$.

Figure 7:
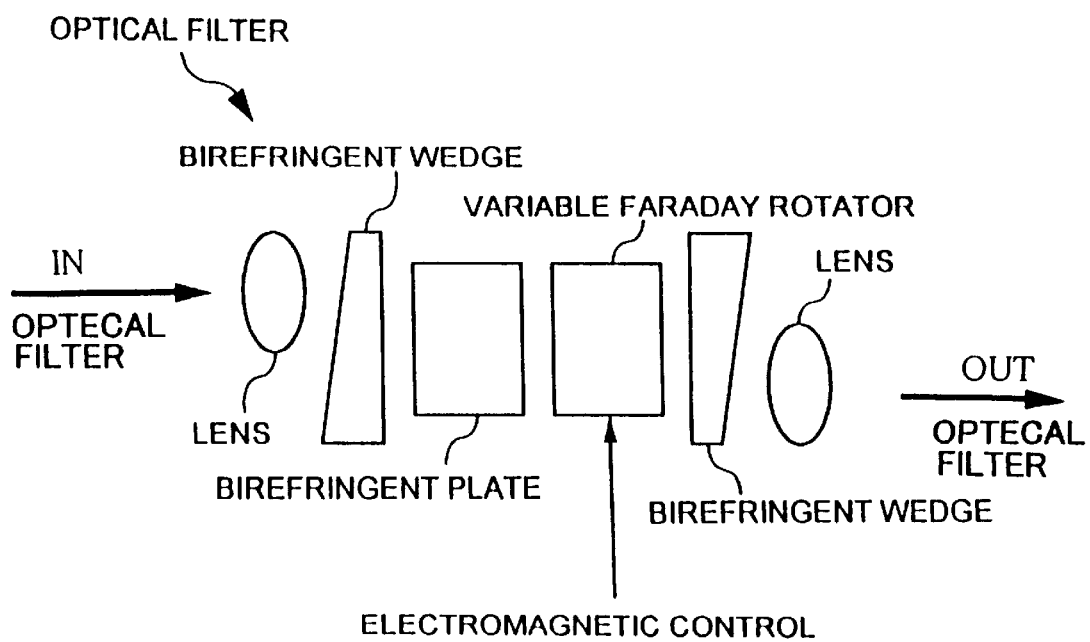
FIG. 7 is a block diagram showing a sample construction of an optical filter used in the second embodiment which utilizes a magneto-optical effect.

FIG. 7 is a block diagram showing a sample construction of the optical filters $11B_2$, $12B_2$ which utilizes a magneto-optical effect.

The optical filter of FIG. 7 is of a construction wherein the incident light is input into a variable Faraday rotator via an input side lens, a birefringent wedge and a birefringent plate, and the light which has passed through the variable Faraday rotator is then output via an output side birefringent wedge and lens. The variable Faraday rotator has a characteristic to be controlled the magnetic field thereof by an external signal to vary the rotational angle of the plane of polarization.

Figure 8:
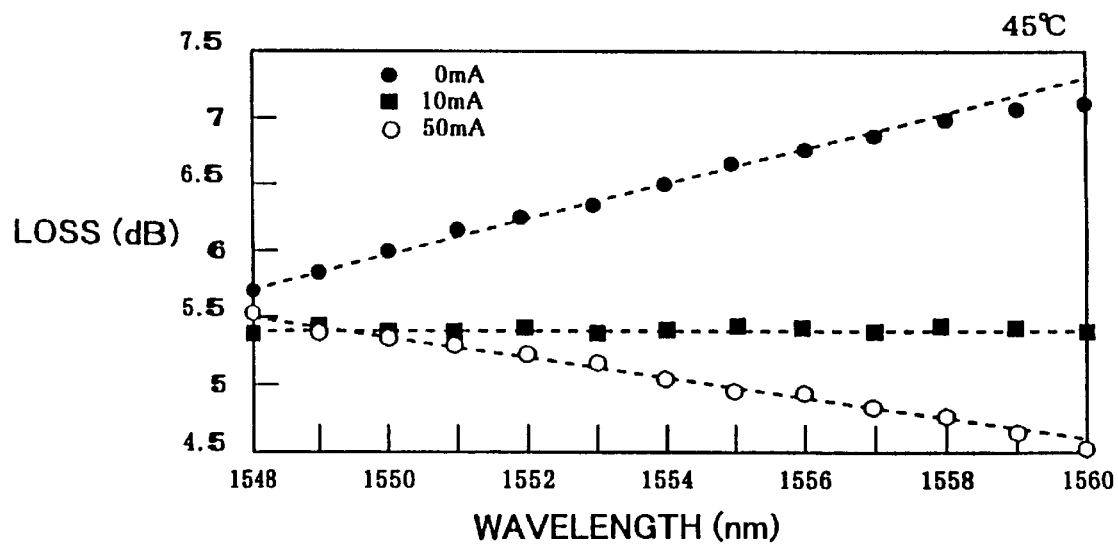
FIG. 8 is a diagram showing variation in the loss wavelength characteristic of the optical filter of FIG. 7.

The loss wavelength characteristic of an optical filter of the type described above which utilizes a magneto-optical effect is such that the loss varies almost linearly with respect to the wavelength, as shown in FIG. 8, and the slope of the loss is able to be controlled by changing the signal (electrical current) supplied to the variable Faraday rotator.

Consequently, by using in combination the optical filters $11B_2$, $12B_2$ for which the loss wavelength characteristics are variable and the optical filters $11B_1$, $12B_1$ for which the loss wavelength characteristics are fixed, the same functionality is achievable as that described for the variable gain equalizers 11B, 12B used in the first embodiment.

With an optical amplifier of such a construction, if the fixed loss wavelength characteristics of each of the optical filters $11B_1$, $12B_1$ are designed to correspond with the gain wavelength characteristic of the EDFA when the input light power is comparatively small, then in those cases where the input light monitoring circuit 13C detects a small input light power level, the gain equalization control circuit 13 outputs a controlling signal to each of the optical filters $11B_2$, $12B_2$ so that the slope of the loss wavelength characteristic for each optical filter $11B_2$, $12B_2$ is approximately zero. In contrast, in those cases where the input light monitoring circuit 13C detects a large input light power level, the gain equalization control circuit 13 outputs a controlling signal to the optical filter $11B_2$ so that the slope of the loss wavelength characteristic for the optical filter $11B_2$ compensates for any deviation from the design value of the gain wavelength characteristic of the EDFA11, and also outputs a controlling signal to the optical filter $12B_2$ so that the slope of the loss wavelength characteristic for the optical filter $12B_2$ is opposite to that of the loss wavelength characteristic for the optical filter $11B_2$. By so doing, the same effects as those observed for the first embodiment are obtainable.

With the second embodiment, even in those cases where it is difficult to achieve with a single optical device a variable gain equalizer with a complex loss wavelength characteristic corresponding to the gain wavelength characteristic of an EDFA, by combining a fixed optical filter and a variable optical filter as described above, it is relatively easy to achieve a variable equalizer with the desired wavelength characteristic.

Next is a description of a third embodiment of a WDM optical amplifier.

Figure 9:
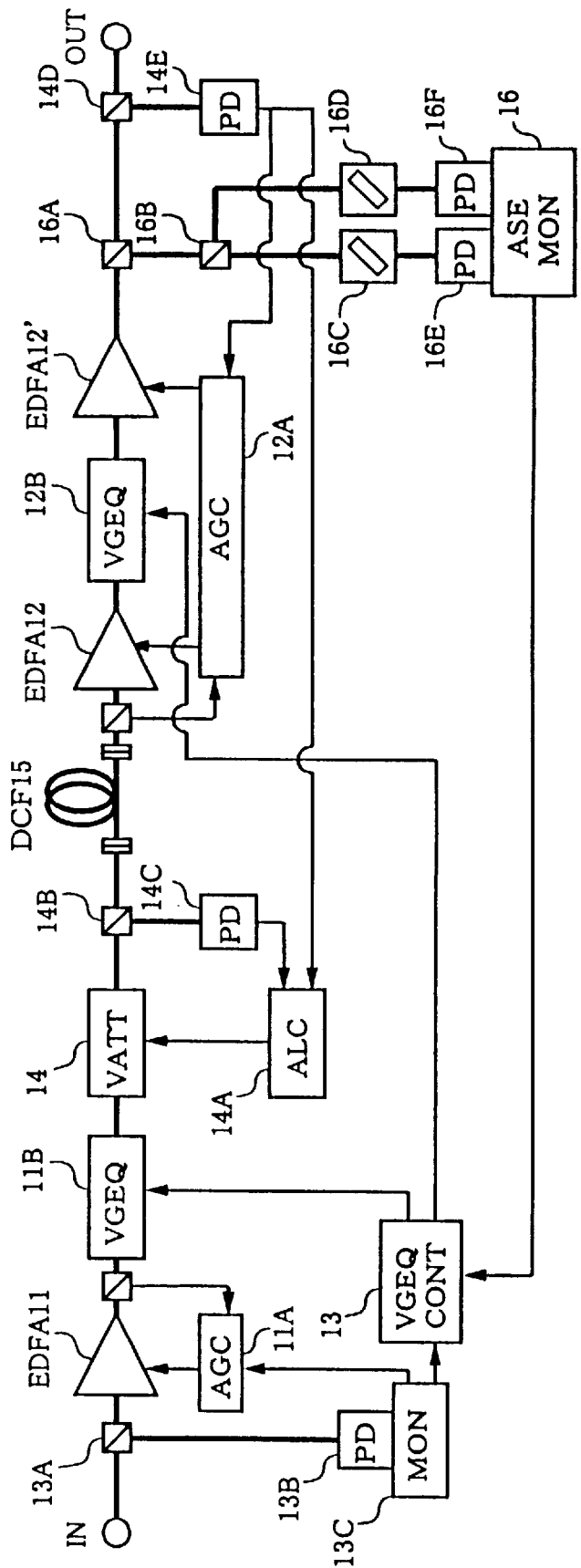
FIG. 9 is a block diagram showing the construction of a third embodiment of an optical amplifier according to the first basic construction.

FIG. 9 is a block diagram showing the construction of a third embodiment of a WDM optical amplifier.

The optical amplifier of this embodiment is constructed so that a construction for detecting the output deviation between channels of the output light, based on spontaneously emission light (ASE light) generated by each of the EDFA11, 12, 12' has been added to the optical amplifier of the first embodiment (FIG. 2). In this description, it is assumed that such a construction is applied to an optical amplifier in which the ratio of the signal light power of the input light to the ASE light at that signal light wavelength is constant with respect to wavelength.

Specifically, added in FIG. 9 are an optical coupler 16A which functions as an output light branching section, an optical coupler 16B which further branches the branched light from the optical coupler 16A into two, optical filters 16C and 16D which function as first and second ASE light sampling sections, photodetectors 16E, 16F which convert the light which has passed through the optical filters 16C, 16D into electrical signals, and an ASE light monitoring circuit 16 which functions as a computing section for determining the ASE light power based on the signals from the photodetectors 16E, 16F. The construction of the optical amplifier is the same as that described above for the first embodiment except for the above differences.

The optical coupler 16A is inserted, for example, between the EDFA12' and the optical coupler 14D, and branches off a portion of the output light from the EDFA12' to send a branched light to the optical coupler 16B.

The optical filter 16C takes one of the optical signals produced by further branching by the optical coupler 16B and extracts the ASE light of a narrow wavelength band near the shortest signal light wavelength in the maximum number of input signals. Furthermore, the optical filter 16D takes the remaining optical signal produced by further branching by the optical coupler 16B and extracts the ASE light of a narrow wavelength band near the longest signal light wavelength in the maximum number of input signals.

Figure 10:
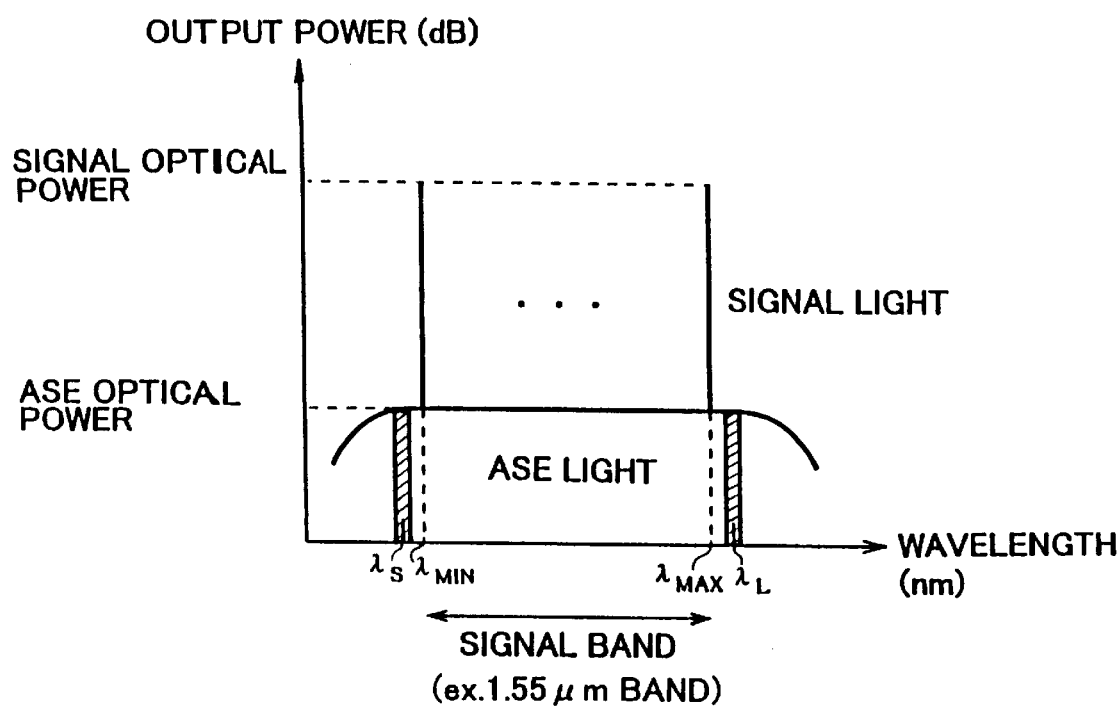
FIG. 10 is a diagram showing a summarized description of ASE light separated by an optical filter in the third embodiment.

FIG. 10 is a diagram summarizing the ASE light extracted by each of the optical filters 16C, 16D.

As shown in FIG. 10, the central wavelength $\lambda_S$ of the transmission band of the optical filter 16C is set near the short wavelength side of the shortest signal wavelength $\lambda_{MIN}$, and the central wavelength $\lambda_L$ of the transmission band of the optical filter 16D is set near the long wavelength side of the longest signal wavelength $\lambda_{MAX}$. The wavelength widths between the central wavelengths $\lambda_S$ and $\lambda_L$, and the signal wavelengths $\lambda_{MIN}$ and $\lambda_{MAX}$ are decided in accordance with the transmission band width of each optical filter 16C, 16D, and are set to the narrowest possible range where the signal light is not included in the optical filter transmission band. Examples of particularly suitable optical filters which have these sharp transmission characteristics include fiber Bragg gratings, and filters with transmission band widths of the order of 0.1 nm have been achieved. In cases where this type of optical filter is used, the width between the central wavelengths $\lambda_S$ and $\lambda_L$, and the signal wavelengths $\lambda_{MIN}$ and $\lambda_{MAX}$ can be set at values in the order of 1 nm.

The ASE light monitoring circuit 16 determines the ASE light power near the shortest wavelength region based on the signal which has been extracted by the optical filter 16C and converted to an electrical signal by the photodetector 16E, as well as the ASE light power near the longest wavelength region based on the signal which has been extracted by the optical filter 16D and converted to an electrical signal by the photodetector 16F, and then computes the output deviation between channels of the output light in accordance with the deviation of each ASE light power level, and sends the thereby computed value to the gain equalization control circuit 13. The reason that the deviation of the ASE light power can be used for the output deviation of the signal light is that the ratio of the signal light to the ASE light level is constant with respect to wavelength.

Moreover in the gain equalization control circuit 13, minor adjustments are made to the loss wavelength characteristic of each variable gain equalizer, so that the output deviation of the signal light detected by the ASE light monitoring circuit 16 is corrected.

With such a configuration for the third embodiment of an optical amplifier, even in those cases where the input signal light power has a wavelength characteristic, gain equalization control can be performed in accordance with the optical amplifier operating environment, to obtain an output light with little output variation between channels. Furthermore, by measuring the ASE light power, the output deviation between channels of the output light can be detected regardless of the number of signal light or any fluctuation in the signal light wavelength, and compensation can be applied for this deviation.

In the third embodiment described above the ASE light propagated over the optical amplifier to the output side was extracted using the optical coupler 16A, but the present invention is not limited to this construction, and the ASE light propagated over in any direction, such as towards the input side, could also be monitored.

Furthermore, the central wavelengths $\lambda_S$, $\lambda_L$ of the optical filters 16C, 16D were set at the external sides of the signal wavelengths $\lambda_{MIN}$, $\lambda_{MAX}$ respectively, but the present invention is not limited to this situation and the central wavelengths $\lambda_S$, $\lambda_L$ could also be set at the internal sides of the signal wavelengths $\lambda_{MIN}$, $\lambda_{MAX}$ respectively. In such a case, it is necessary to ensure that the signal wavelength next to the signal wavelengths $\lambda_{MIN}$, $\lambda_{MAX}$ do not lie within the transmission band of each optical filter 16C, 16D.

Next is a description of a fourth embodiment of a WDM optical amplifier.

Figure 11:
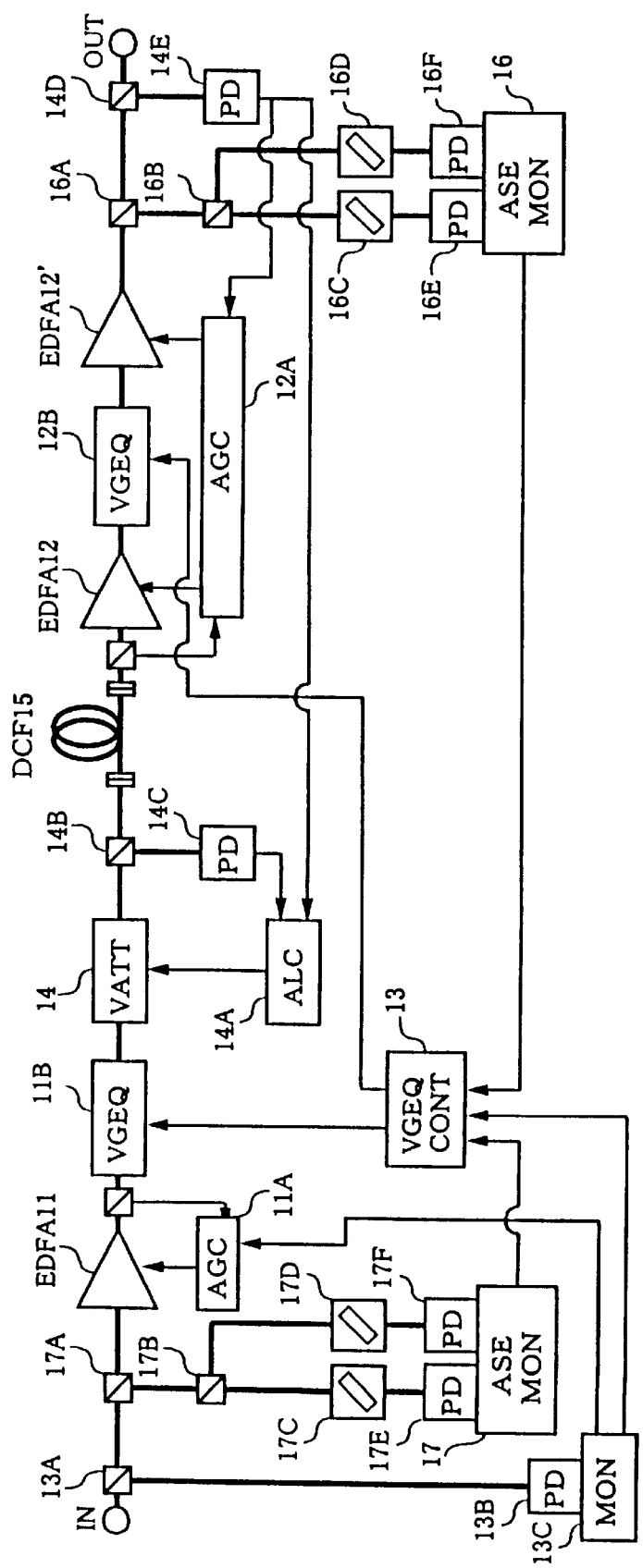
FIG. 11 is a block diagram showing the construction of a fourth embodiment of an optical amplifier according to the first basic construction.

FIG. 11 is a block diagram showing the construction of a fourth embodiment of a WDM optical amplifier.

The optical amplifier of this embodiment is an improved version of the optical amplifier of the third embodiment which can be used even in those cases where the ratio of the signal light power of the input light to the ASE light at that particular signal light wavelength is not uniform with respect to wavelength.

As shown in FIG. 11 the optical amplifier of this fourth embodiment is constructed so that an optical coupler 17A which functions as an input light branching section, an optical coupler 17B which further branches the branched light from the optical coupler 17A into two, optical filters 17C and 17D which function as third and fourth ASE light extraction sections, photodetectors (PD) 17E, 17F which convert the light which has passed through the optical filters 17C, 17D into electrical signals, and an ASE light monitoring circuit (ASE MON) 17 for determining the ASE light power based on the signals from the photodetectors 17E, 17F are added to the optical amplifier of the third embodiment (FIG. 9). The construction of the optical amplifier is the same as that described above for the third embodiment except for the above differences.

The optical coupler 17A is inserted, for example, between the optical coupler 13A and the EDFA11, and branches off a portion of the input light of the optical amplifier to send a branched light to the optical coupler 17B. The same type of filters as those used for the optical filters 16C, 16D can be used for the optical filters 17C, 17D.

The ASE light monitoring circuit 17 determines the ASE light power near the shortest wavelength region based on the signal which has been extracted by the optical filter 17C and converted to an electrical signal by the photodetector 17E, as well as the ASE light power near the longest wavelength region based on the signal which has been extracted by the optical filter 17D and converted to an electrical signal by the photodetector 17F, and then sends the respective power values to the gain equalization control circuit 13.

With an optical amplifier of such a construction, the optical power near both the shortest wavelength region and the longest wavelength region of the ASE light incorporated in the output light is detected by the ASE light monitoring circuit 16, and sent to the gain equalization control circuit 13. Furthermore, concurrently the optical power of both the shortest wavelength region and the longest wavelength region of the ASE light incorporated in the input light is detected by the ASE light monitoring circuit 17, and also sent to the gain equalization control circuit 13. The gain equalization control circuit 13 then computes, for the ASE light power at both the shortest wavelength region and the longest wavelength region, the value obtained by subtracting the output value (as detected by the ASE light monitoring circuit 16) from the input value (as detected by the ASE light monitoring circuit 17). Then, minor adjustments are performed on the loss wavelength characteristic of each of the variable gain equalizers, so that the computed values for the short wavelength side and the long wavelength side are equalized. In so doing, the gain equalization control can be implemented for obtaining an output light which has the same wavelength characteristic as that of the ratio of the signal light to the ASE light of the input light. Of course gain equalization control can be reliably used for measuring the ASE light power regardless of the number of signal light or any fluctuation in the signal light wavelength.

Next is a description of a second basic construction, produced by modification of the first basic construction.

Figure 12:
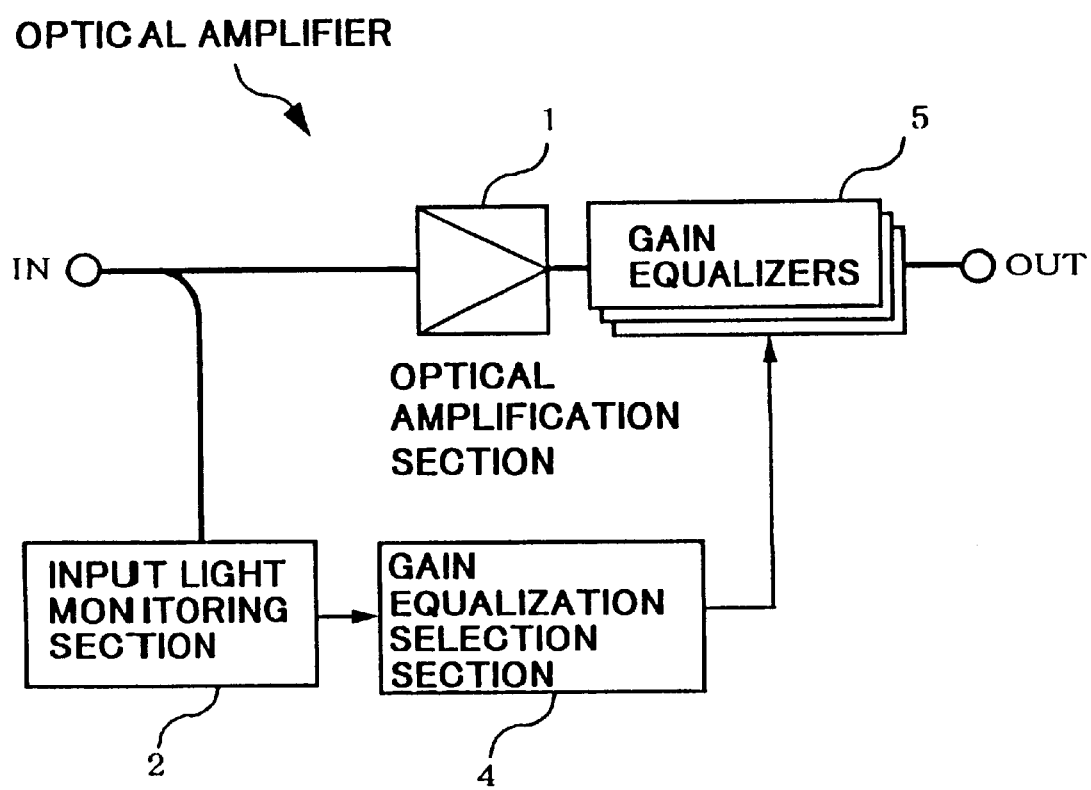
FIG. 12 is a block diagram showing a second basic construction of a WDM optical amplifier according to the present invention.

FIG. 12 is a block diagram showing a second basic construction of a WDM optical amplifier.

In FIG. 12, an optical amplifier of this second basic construction comprises the same optical amplification section 1 and input light monitoring section 2 used in the first basic construction, as well as a plurality of gain equalizers 5 with mutually different fixed loss wavelength characteristics, and a gain equalization selection section 6 which functions as a gain equalization control device and which selects one of the plurality of gain equalizers 5 in accordance with the input light power measured by the input light monitoring section 2 and then connects the selected gain equalizer between for example the optical amplification section 1 and the output port OUT.

The plurality of gain equalizers 5 have mutually different loss wavelength characteristics which are capable of suppressing the gain wavelength dependency of the optical amplification section 1, and the loss wavelength characteristics of the respective gain equalizers 5 are set in advance to correspond with the gain wavelength characteristic of the optical amplification section 1 which varies in accordance with the input light power. Examples of suitable optical devices which can be used as the gain equalizers 5 include fusion WDM couplers, fiber Bragg gratings and etalon filters.

The gain equalization selection section 6 determines the operating state of the optical amplification section 1 based on the value of the input light power received from the input light monitoring section 2, then selects from the plurality of gain equalizers 5 the one gain equalizer 5 with a loss wavelength characteristic which corresponds to the gain wavelength characteristic of the optical amplification section 1, and then connects the selected gain equalizer 5 to the output side of the optical amplification section 1. The above description details the case where the selected gain equalizer 5 is connected to the output side of the optical amplification section 1, but the connection position for the gain equalizer 5 could also be at the input side of the optical amplification section 1.

With the optical amplifier of the second basic construction, when a WDM signal light is input via the input port IN, the signal light of each wavelength of the input light are amplified in one batch and the input light power is monitored by the input light monitoring section 2, as was the case for the first basic construction. The input light power value obtained by the input light monitoring section 2 is then sent to the gain equalization selection section 6, and the gain equalization selection section 6 selects a gain equalizer 5 which corresponds with the input light power, and the selected gain equalizer 5 is then connected to the output side of the optical amplification section 1. The WDM signal light which has been amplified by the optical amplification section 1 is subsequently sent to the selected gain equalizer 5 where it is attenuated in accordance with the fixed loss wavelength characteristic, and a WDM signal light having a uniform power level with respect to wavelength is output. In this way, an optical amplifier of the second basic construction achieves the same effects as that of the first basic construction.

Figure 13:
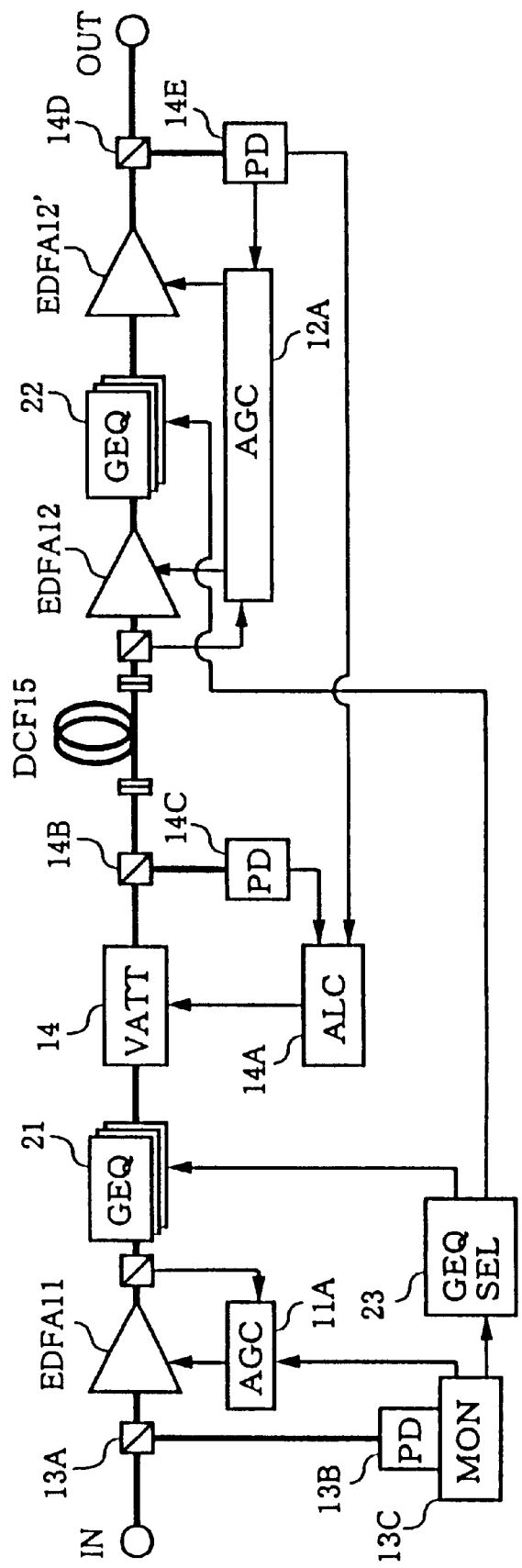
FIG. 13 is a block diagram showing the construction of an optical amplifier according to the second basic construction, applied in the same manner as for the first embodiment.

For the second basic construction described above, the aforementioned first embodiment can be realized by replacing each of the variable gain equalizers 11B, 12B with a plurality of gain equalizers (GEQ) 21, 22, and replacing the gain equalization control circuit 13 with a gain equalization selection circuit (GEQ SEL) 23, as shown in the block diagram of FIG. 13. Furthermore, the second embodiment can be realized by replacing each of the optical filters 11B$_2$, 12B$_2$, which have variable loss wavelength characteristics, with a plurality of gain equalizers 21, 22 to give a combination of a single fixed optical filter 11B$_1$, 12B$_1$, as seen in conventional devices, with a plurality of gain equalizers 21, 22, and moreover replacing the gain equalization control circuit 13 with a gain equalization selection circuit 23. The third and fourth embodiments can also be realized in the same manner as that described above.

Next is a description of a specific investigation conducted into the amount of compensation required for the plurality of gain equalizers 5.

Within the installation environment of the optical amplifier, those wavelength characteristics which are considered to usually occur as a constant are the loss wavelength characteristic of the optical fiber transmission path, the loss wavelength characteristic of the dispersion compensation device (DCF, etc.), the gain wavelength characteristic of the optical amplifier itself, and the loss wavelength characteristic resulting from deterioration with time lapse. An estimation of each of the above wavelength characteristics for a 1.55 μm signal light band yields a loss wavelength characteristic for the optical fiber transmission path (1.3 μmSMF, 80 km) of −0.5 dB, a loss wavelength characteristic for the dispersion compensation fiber of ±0.5 dB, a gain wavelength characteristic of the optical amplifier of ±1.0 dB, and a loss wavelength characteristic resulting from deterioration with time lapse of ±0.5 dB. In those cases where the insertion loss (or the insertion gain) relative to the wavelength is increased, the "+" value is applied, whereas in those cases where the insertion loss (or the insertion gain) relative to the wavelength is decreased the "−" value is applied. The wavelength characteristic resulting from simple addition of the absolute values of the above values is 2.5 dB.

Figure 14:
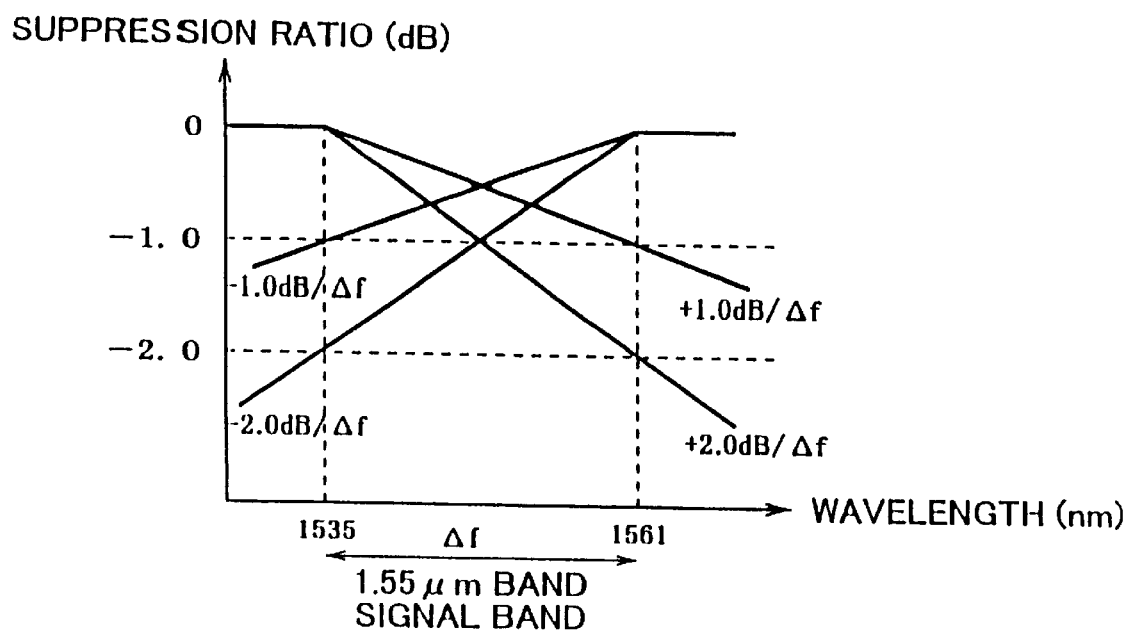
FIG. 14 is a diagram showing a sample combination of the loss wavelength characteristics of a gain equalizer for the second basic construction.

Consequently, as a combination of a plurality of gain equalizers 5, by providing a gain equalizer with a loss wavelength characteristic of slope +1.0 dB in the 1.55 μm band, a gain equalizer with a loss wavelength characteristic of slope +2.0 dB in the 1.55 μm band, a gain equalizer with a loss wavelength characteristic of slope −1.0 dB in the 1.55 μm band, and a gain equalizer with a loss wavelength characteristic of slope −2.0 dB in the 1.55 μm band, gain compensation is possible in many cases. The loss wavelength characteristic of each gain equalizer is shown in FIG. 14. Note that the above combination is merely a single example, and the present invention is in no way limited to this example.

Next is a description of an embodiment of an optical communication system of the present invention.

Figure 15:
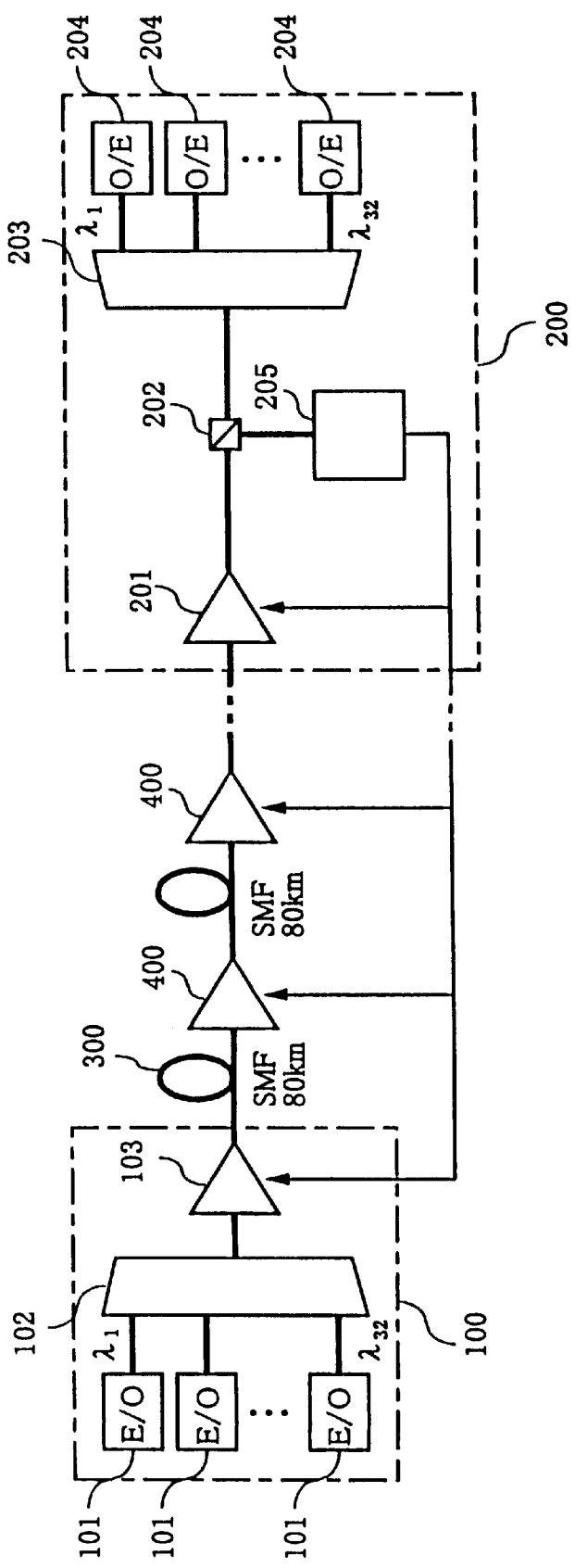
FIG. 15 is a block diagram showing the construction of an optical communication system according to the present invention.

FIG. 15 is a block diagram showing the construction of an optical communication system according to the present embodiment.

In FIG. 15, the optical communication system is constructed of a transmission end terminal station 100, a reception end terminal station 200, an optical fiber transmission path 300 which links the transmission end and reception end terminal stations, and a plurality of optical repeater stations 400 which are provided along the optical fiber transmission path 300.

The transmission end terminal station 100 is equipped with a plurality of optical transmitters (E/O) 101 which each output an optical signal of a different wavelength (32 waves for example), a multiplexer 102 which wavelength division multiplexes the plurality of optical signals to generate a WDM signal light and then outputs the WDM signal light to the optical fiber transmission path 300, and a post-amplifier 103 which amplifies the WDM signal light to a required level.

The reception end terminal station 200 is equipped with a pre-amplifier 201 which amplifies the WDM signal light transmitted via the optical fiber transmission path 300 to a required level, an optical coupler 202 which branches off a portion of the output light from the pre-amplifier 201, a demultiplexer 203 which divides the WDM signal light that has passed through the optical coupler 202 into a plurality of optical signals in accordance with the wavelengths thereof, a plurality of optical receivers (O/E) 204 which receive and process each of the plurality of optical signals, and a reception monitoring section 205 which takes the WDM signal light branched off by the optical coupler 202 to measure the optical SN ratio for each wavelength at the reception end terminal station 200 and then judges the transmission state of the WDM signal light. In this case, the reception monitoring section 205 functions as an optical SN ratio measurement device and a gain equalization management device.

The optical fiber transmission path 300 is a typical optical transmission path such as a single mode optical fiber (SMF). The length of the SMF between the respective terminal stations is 80 km here, but the length is not limited to this value.

Each optical repeater station 400 is equipped with one of the WDM optical amplifier embodiments described above, and amplifies, in one batch, the WDM signal light transmitted via the optical fiber transmission path 300. Furthermore, any one of the WDM optical amplifiers shown in the embodiments described above is also appropriate for use in the post-amplifier 103 of the transmission end terminal station 100 and the pre-amplifier 201 of the reception end terminal station 200. A signal (management signal) output from the reception monitoring section 205 of the reception end terminal station 200 is sent to the gain equalization control circuit 13 (or alternatively the gain equalization selection circuit 23) of the WDM optical amplifier provided in each of the stations. This signal is for controlling the gain equalization operation of each optical amplifier in accordance with the transmission state of the WDM signal light as judged by the reception monitoring section 205.

Next is a description of the gain equalization control operation in an optical communication system of the construction described above.

Generally, in order to obtain predetermined transmission characteristics in a WDM optical communication system using an optical amplifier, it is necessary, at each amplification repeater stage, to suppress the fluctuation in signal light power between each wavelength (channel) to 1 dB or less. It is known that the upper limit value of each signal light power is restricted by a non-linear effect, and the lower limit restricted by the reception SN ratio. Consequently, it is necessary to lower the gain wavelength characteristics of each optical amplifier, as well as lower the loss wavelength characteristics of the optical fiber transmission path 300 and the like, which constitute the optical communication system.

Figure 16:
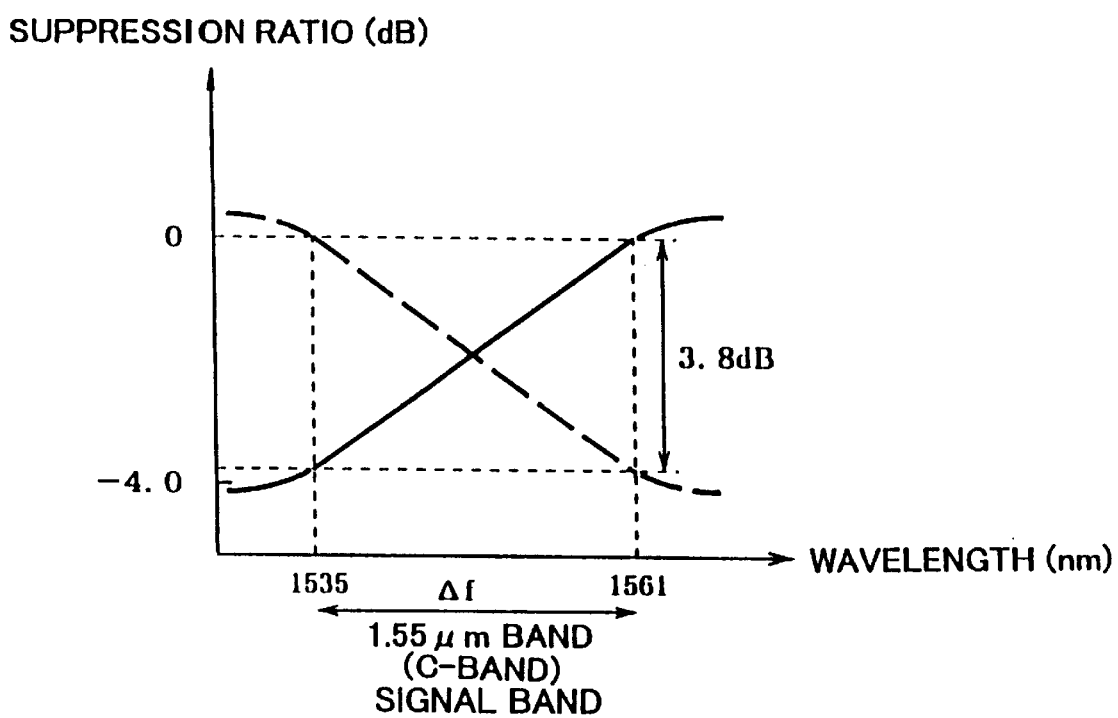
FIG. 16 is a diagram showing loss wavelength characteristics for a variable gain equalizer of an optical amplifier used in an optical communication system of the present invention.

In the optical communication system, for the gain equalization process carried out in the variable gain equalizer (or alternatively the plurality of gain equalizers) of each optical amplifier, it is desirable that compensation is applied not only for the loss wavelength characteristics outlined above which usually occur as a constant (estimated value 2.5 dB), but also for those loss wavelength characteristics occurring due to factors such as dynamic variation in the input conditions, or variation in temperature. Specifically for example, the present applicants have confirmed that the loss wavelength characteristic occurring in a transmission path (SMF, 80 km) due to induced Raman scattering is approximately −1 dB, and furthermore, it is thought that the loss wavelength characteristic occurring as a result of the temperature characteristics of the optical fiber transmission path, the dispersion compensation fiber and the optical amplifier is ±0.3 dB. Adding these values to the previously estimated value of 2.5 dB, generates a requirement for the variable gain equalizer (or plurality of gain equalizers) of each optical amplifier to have a width of variation in loss wavelength characteristic of approximately 3.8 dB. The loss wavelength characteristic for a variable gain equalizer in such a case is shown in FIG. 16.

With the above kinds of loss wavelength characteristics due to induced Raman scattering and temperature variation, specifying in which section of the optical communication system the loss wavelength characteristic is occurring can be difficult, and so it is necessary to make a judgement based on the reception state of the WDM signal light at the reception end terminal station 200. In an optical communication system of the present invention, the optical SN ratio is measured by the reception monitoring section 205 of the reception end terminal station 200, and in those cases where the measured optical SN ratio value has deteriorated below a preset threshold value, a management signal for controlling the gain equalization operation of each of the optical amplifiers is output from the reception monitoring section 205 to each of the optical amplifiers.

This management signal is sent preferentially to the optical amplifiers located closest to the transmission end (upstream) of the optical communication system, and then output sequentially to the optical amplifiers closer to the reception end (downstream). Upon reception of the management signal, the gain equalization control circuit 13 (or alternatively the gain equalization selection circuit 23) varies the loss characteristics of the variable gain equalizers in a stepwise manner (or alternately connects the plurality of gain equalizers in sequence), and the reception SN ratio is measured by the. reception monitoring section 205 after each variation. Then, when the above operation has been completed for all the optical amplifiers, the loss wavelength characteristic of each variable gain equalizer is set so as to achieve the operating state corresponding to the best transmission characteristics.

In the above description, the described series of processing was executed when the reception SN ratio deteriorated below a threshold value, but the gain equalization control method in the present invention is not limited to this particular processing. For example, it is also possible to randomly vary the loss characteristics of the variable gain equalizers of each optical amplifier over a specified time period and then measure the reception SN ratio, and then subsequently set the loss wavelength characteristic of each variable gain equalizer to the operating state which yielded the best transmission characteristics.

In this manner, with an optical communication system of the present invention, in which WDM optical amplifiers of the embodiments described above are adopted to the optical amplifiers used in the optical repeater stations 400 and the like, by suppressing variation in the optical power between each channel for each optical amplifier, for the loss wavelength characteristics and the gain wavelength characteristics of the optical amplifier itself which occur in the installation environment of the optical amplifier, it becomes possible to apply gain compensation of the optimum amount at the most appropriate location in the optical communication system, thus enabling good transmission characteristics to be achieved.

In each of the embodiments described above the 1.55 $\mu$m band was used as the wavelength band of the WDM signal light, but the present invention is not limited to this case, and for example, the embodiments can be employed with a WDM signal light of a wavelength band which corresponds to the 1.58 $\mu$m band, which takes notice as an amplification band for the long wavelength side of an EDFA. Furthermore, EDFA was used in the above descriptions as the amplification device, but the invention is not limited to EDF, and for example rare earth element doped optical fiber amplifiers which incorporate a rare earth element other than erbium can also be used.

What is claimed is:

1. A wavelength division multiplexing optical amplifier equipped with optical amplification means for amplifying in one batch a wavelength division multiplexed signal light, comprising:

input light measurement means for measuring input light power;

gain equalization means which is connected to said optical amplification means, having loss wavelength characteristics for suppressing the wavelength dependency of the gain of said optical amplification means, and varying the profile to the wavelength of said loss wavelength characteristics;

gain equalization control means for controlling the loss wavelength characteristics of said gain equalization means in accordance with the input light power measured by said input light measurement means; and output level control means for controlling the output light power per single wavelength at a constant level, wherein said gain equalization control means controls the loss wavelength characteristics of said gain equalization means so that a deviation of noise figure due to wavelength difference is small when the input light power varies.

2. A wavelength division multiplexing optical amplifier according to claim 1, wherein said gain equalization means is provided for each stage of said optical amplification means of a multi-stage construction, and said gain equalization control means respectively controls the loss wavelength characteristic of each of said gain equalization means.

3. A wavelength division multiplexing optical amplifier according to claim 2, wherein there is provided gain constant control means for controlling at a constant level the gain of said optical amplification means, and said gain equalization control means judges whether or not the optical amplification operation of the foremost stage optical amplification means is saturated, based on the input light power measured by said input light measurement means, and then respectively controls the loss wavelength characteristic of each of said gain equalization means.

4. A wavelength division multiplexing optical amplifier according to claim 3, wherein said wavelength division multiplexed signal light has a wavelength band of 1.55 μm, said optical amplification means incorporates an erbium doped optical fiber amplifier, and said gain equalization control means controls the loss wavelength characteristics so that when a judgement is made of saturation of the optical amplification operation in said foremost stage optical amplification means, the amount of loss at the short wavelength side of the 1.55 μm band for said gain equalization means provided at said foremost stage optical amplification means is less than the amount of loss when the optical amplification operation is not saturated.

5. A wavelength division multiplexing optical amplifier according to claim 2, wherein of said plurality of gain equalization means, the gain equalization means provided for said foremost stage optical amplification means is connected to the output side of said foremost stage optical amplification means, and of said plurality of gain equalization means, the gain equalization means provided for the lattermost stage optical amplification means is connected to the input side of said lattermost stage optical amplification means.

6. A wavelength division multiplexing optical amplifier according to claim 1, wherein said output level control means is equipped with a variable optical attenuation section which is connected between the foremost stage optical amplification means and the lattermost stage optical amplification means, and an optical attenuation amount control section for controlling the amount of optical attenuation at said variable optical attenuation section so that the output light power per single wavelength attains a constant level.

7. A wavelength division multiplexing optical amplifier according to claim 1, wherein said gain equalization means is equipped with a first optical filter with a fixed loss wavelength characteristic, and a second filter with a linear loss with respect to wavelength and in which the slope of the loss wavelength characteristic is able to be varied, and said gain equalization control means controls the loss wavelength characteristic of said second filter in accordance with the input light power measured by said input light measurement means.

8. A wavelength division multiplexing optical amplifier according to claim 1, wherein there is provided output deviation detection means for detecting, based on spontaneous emission light generated by said optical amplification means, the output deviation between the signal light of each wavelength incorporated in the output light, and said gain equalization control means controls the loss wavelength characteristic of said gain equalization means in accordance with the input light power measured by said input light measurement means and the output deviation detected by said output deviation detection means.

9. A wavelength division multiplexing optical amplifier according to claim 8, wherein in the case where the ratio of the signal light power of the input light to the spontaneous emission light power at that signal light wavelength is constant with respect to wavelength, said output deviation detection means is provided with;

an output light branching section for branching a portion of the output light, a first spontaneous emission light extraction section for extracting from the branched light of said output light branching section only the spontaneous emission light of the wavelength near the shortest signal light wavelength in the maximum number of input signals, a second spontaneous emission light extraction section for extracting from the branched light of said output light branching section only the spontaneous emission light of the wavelength near the longest signal light wavelength in the maximum number of input signals, and a computing section for determining the output deviation of the output signal light based on the power of spontaneous emission light extracted by said first and second spontaneous emission light extraction sections.

10. A wavelength division multiplexing optical amplifier according to claim 8, wherein in the case where the ratio of the signal light power of the input light to the spontaneous emission light power at that signal light wavelength is not uniform with respect to wavelength, said output deviation detection means is provided with;

an output light branching section for branching a portion of the output light, a first spontaneous emission light extraction section for extracting from the branched light of said output light branching section only the spontaneous emission light of the wavelength near the shortest signal light wavelength in the maximum number of input signals, a second spontaneous emission light extraction section for extracting from the branched light of said output light branching section only the spontaneous emission light of the wavelength near the longest signal light wavelength in the maximum number of input signals, an input light branching section for branching a portion of the input light, a third spontaneous emission light extraction section for extracting from the branched light of said input light branching section only the spontaneous emission light of the wavelength near the shortest signal light wavelength in the maximum number of input signals, a fourth spontaneous emission light extraction section for extracting from the branched light of said input light branching section only the spontaneous emission light of the wavelength near the longest signal light wavelength in the maximum number of input signals, and a computing section for determining the output deviation of the output signal light based on the power of spontaneous emission light extracted by said first through fourth spontaneous emission light extraction sections.

11. A wavelength division multiplexing optical amplifier according to claim 1, wherein said gain equalization means is equipped with a plurality of gain equalizers which each have a different fixed loss wavelength characteristic, and said gain equalization control means selects one of said plurality of gain equalizers in accordance with the input light power measured by said input light measurement means and connects the selected gain equalizer to said optical amplification means.

12. An optical communication system equipped with a plurality of wavelength division multiplexing optical amplifiers of claim 1, comprises;

optical SN ratio measurement means for measuring the optical SN ratio of the wavelength division multiplexed signal light transmitted through said plurality of wavelength division multiplexing optical amplifiers, and gain equalization management means for sending sequentially to said gain equalization control means of each of said plurality of wavelength division multiplexing optical amplifiers a management signal for controlling the loss wavelength characteristic of said gain equalization means so that the optical SN ratio measured by said optical SN ratio measurement means is improved beyond a preset value.

13. An optical communication system according to claim 12, wherein said gain equalization management means sends said management signal firstly to the gain equalization control means of said wavelength division multiplexing optical amplifier located at the transmission end.

14. A wavelength division multiplexing optical amplifier equipped with optical amplification means for amplifying in one batch a wavelength division multiplexed signal light, comprising:

input light measurement means for measuring input light power;

gain equalization means which is connected to said optical amplification means, having loss wavelength characteristics for suppressing the wavelength dependency of the gain of said optical amplification means, and varying said loss wavelength characteristics; and gain equalization control means for controlling the loss wavelength characteristics of said gain equalization means in accordance with the input light power measured by said input light measurement means, said gain equalization means is equipped with a first optical filter with a fixed loss wavelength characteristic, and a second filter with a linear loss with respect to wavelength and in which the slope of the loss wavelength characteristic is able to be varied, and said gain equalization control means controls the loss wavelength characteristic of said second filter in accordance with the input light power measured by said input light measurement means.

15. A wavelength division multiplexing optical amplifier equipped with optical amplification means for amplifying in one batch a wavelength division multiplexed signal light, comprising:

input light measurement means for measuring input light power;

gain equalization means which is connected to said optical amplification means, having loss wavelength characteristics for suppressing the wavelength dependency of the gain of said optical amplification means, and varying said loss wavelength characteristics; and gain equalization control means for controlling the loss wavelength characteristics of said gain equalization means in accordance with the input light power measured by said input light measurement means, wherein there is provided output deviation detection means for detecting, based on spontaneous emission light generated by said optical amplification means, the output deviation between the signal light of each wavelength incorporated in the output light, and said gain equalization control means controls the loss wavelength characteristic of said gain equalization means in accordance with the input light power measured by said input light measurement means and the output deviation detected by said output deviation detection means.

16. A wavelength division multiplexing optical amplifier according to claim 15, wherein in the case where the ratio of the signal light power of the input light to the spontaneous emission light power at that signal light wavelength is constant with respect to wavelength, said output deviation detection means is provided with;

an output light branching section for branching a portion of the output light, a first spontaneous emission light extraction section for extracting from the branched light of said output light branching section only the spontaneous emission light of the wavelength near the shortest signal light wavelength in the maximum number of input signals, a second spontaneous emission light extraction section for extracting from the branched light of said output light branching section only the spontaneous emission light of the wavelength near the longest signal light wavelength in the maximum number of input signals, and a computing section for determining the output deviation of the output signal light based on the power of spontaneous emission light extracted by said first and second spontaneous emission light extraction sections.

17. A wavelength division multiplexing optical amplifier according to claim 15, wherein in the case where the ratio of the signal light power of the input light to the spontaneous emission light power at that signal light wavelength is not uniform with respect to wavelength, said output deviation detection means is provided with;

an output light branching section for branching a portion of the output light, a first spontaneous emission light extraction section for extracting from the branched light of said output light branching section only the spontaneous emission light of the wavelength near the shortest signal light wavelength in the maximum number of input signals, a second spontaneous emission light extraction section for extracting from the branched light of said output light branching section only the spontaneous emission light of the wavelength near the longest signal light wavelength in the maximum number of input signals, an input light branching section for branching a portion of the input light, a third spontaneous emission light extraction section for extracting from the branched light of said input light branching section only the spontaneous emission light of the wavelength near the shortest signal light wavelength in the maximum number of input signals, a fourth spontaneous emission light extraction section for extracting from the branched light of said input light branching section only the spontaneous emission light of the wavelength near the longest signal light wavelength in the maximum number of input signals, and a computing section for determining the output deviation of the output signal light based on the power of spontaneous emission light extracted by said first through fourth spontaneous emission light extraction sections.

18. A wavelength division multiplexing optical amplifier equipped with optical amplification means for amplifying in one batch a wavelength division multiplexed signal light, comprising:

input light measurement means for measuring input light power;

gain equalization means which is connected to said optical amplification means, having loss wavelength characteristics for suppressing the wavelength dependency of the gain of said optical amplification means, and varying said loss wavelength characteristics;

gain equalization control means for controlling the loss wavelength characteristics of said gain equalization means in accordance with the input light power measured by said input light measurement means;

optical SN ratio measurement means for measuring the optical SN ratio of the wavelength division multiplexed signal light transmitted through said plurality of wavelength division multiplexing optical amplifiers; and gain equalization management means for sending sequentially to said gain equalization control means of each of said plurality of wavelength division multiplexing optical amplifiers a management signal for controlling the loss wavelength characteristic of said gain equalization means so that the optical SN ratio measured by said optical SN ratio measurement means is improved beyond a preset value, wherein said gain equalization management means sends said management signal firstly to the gain equalization control means of said wavelength division multiplexing optical amplifier located at the transmission end.

* * * * *